Dec. 9, 1930.  J. H. FARRAR  1,784,587
COIN CONTROLLED VENDING MACHINE
Filed Dec. 1, 1927   15 Sheets-Sheet 2
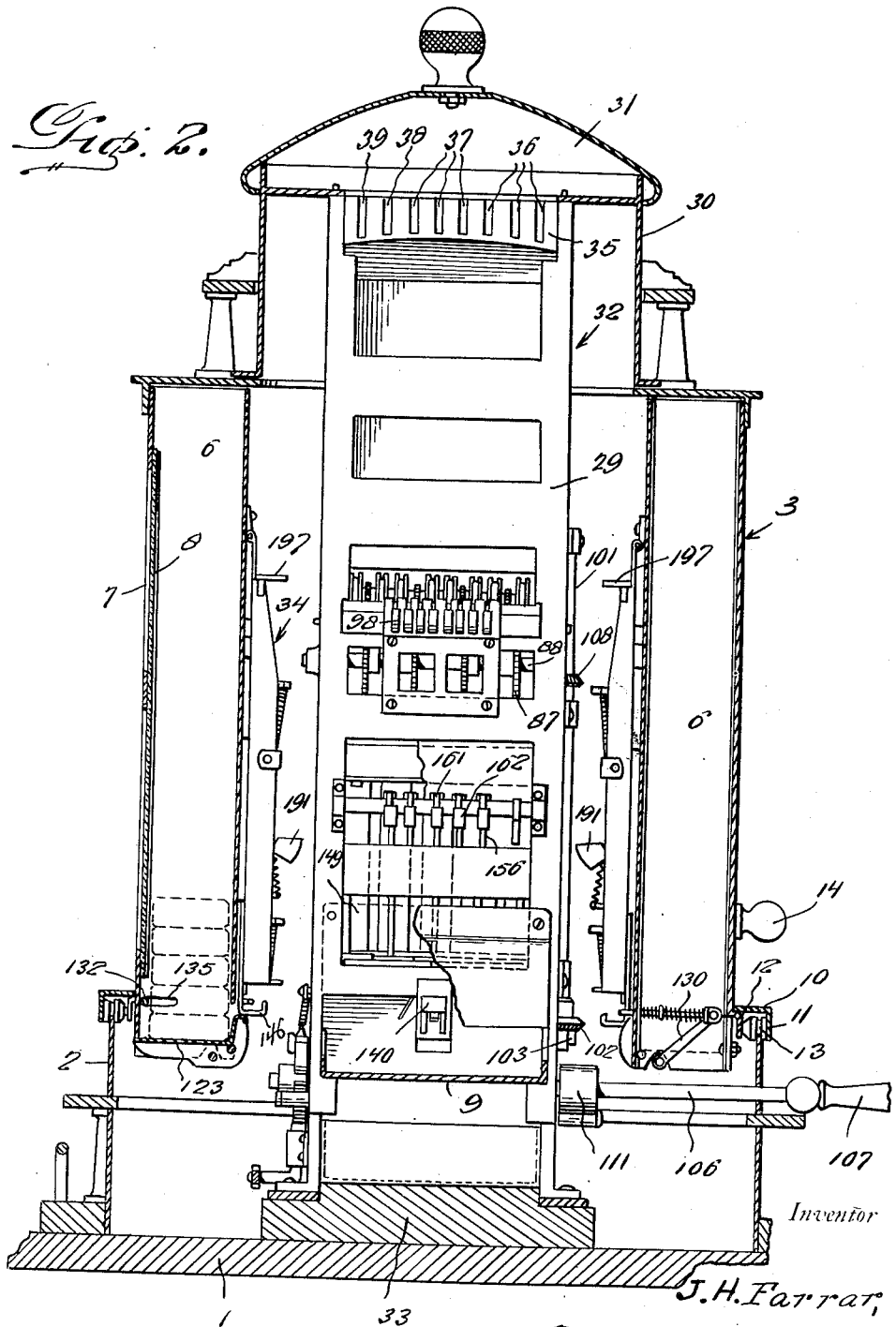

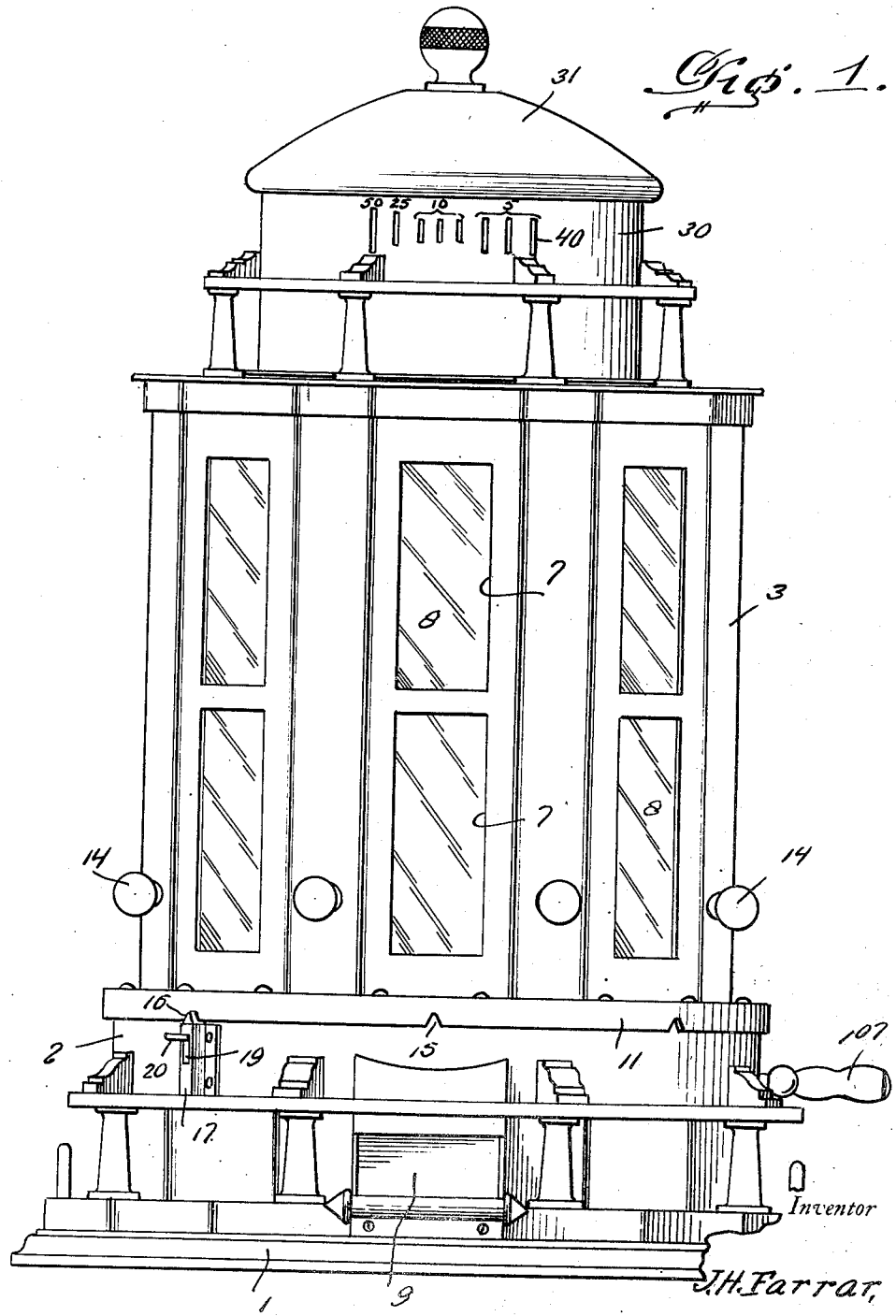

Dec. 9, 1930.  J. H. FARRAR  1,784,587
COIN CONTROLLED VENDING MACHINE
Filed Dec. 1, 1927  15 Sheets-Sheet 3
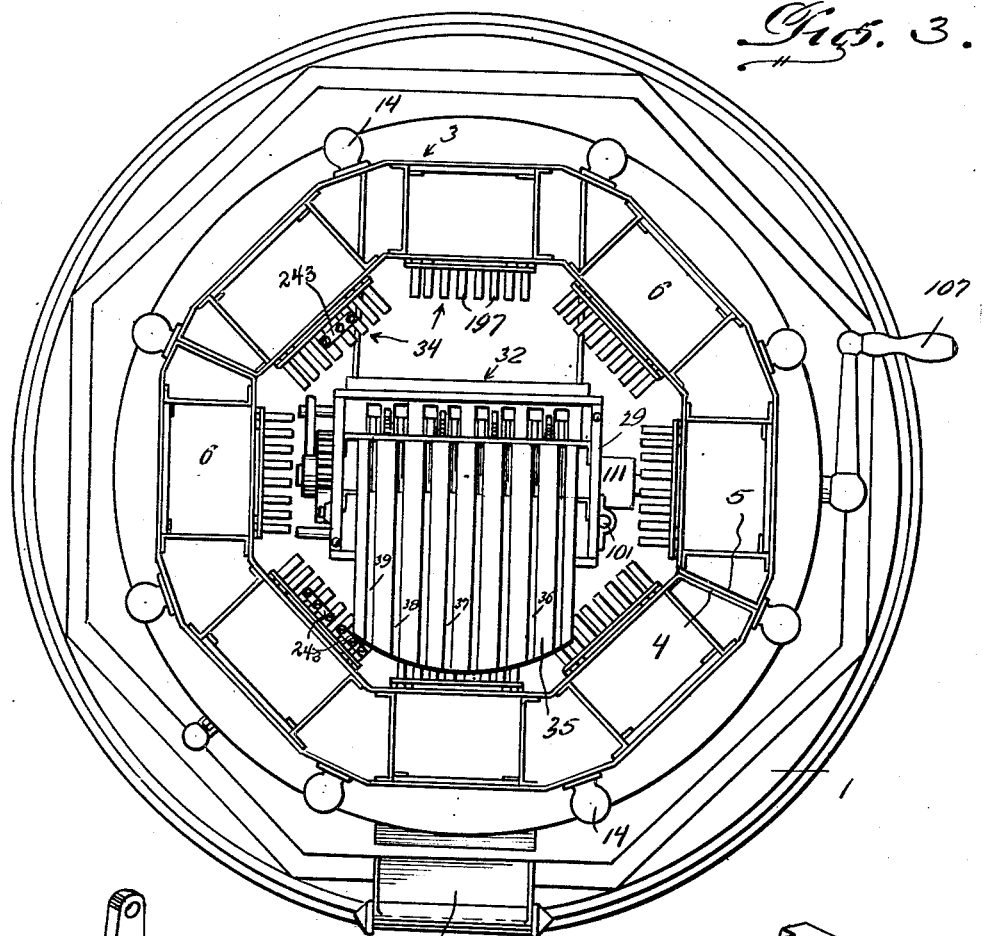
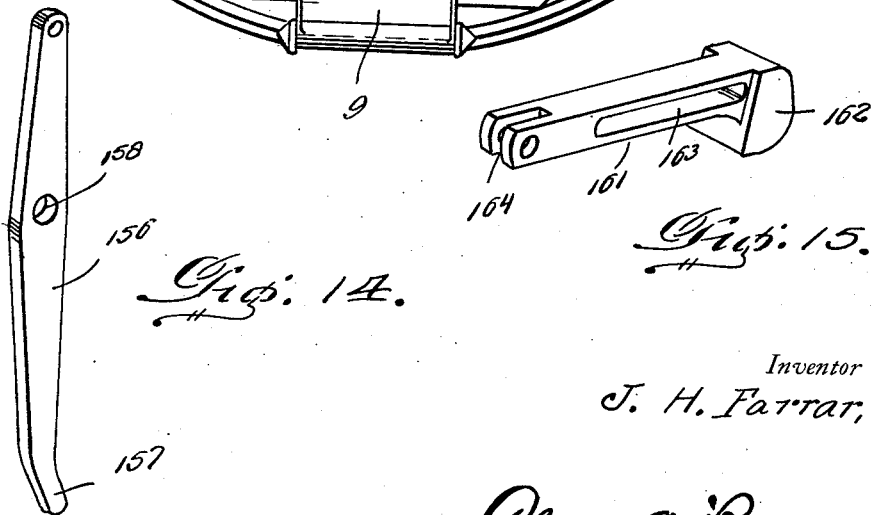
Inventor
J. H. Farrar,
By Clarence A. O'Brien
Attorney

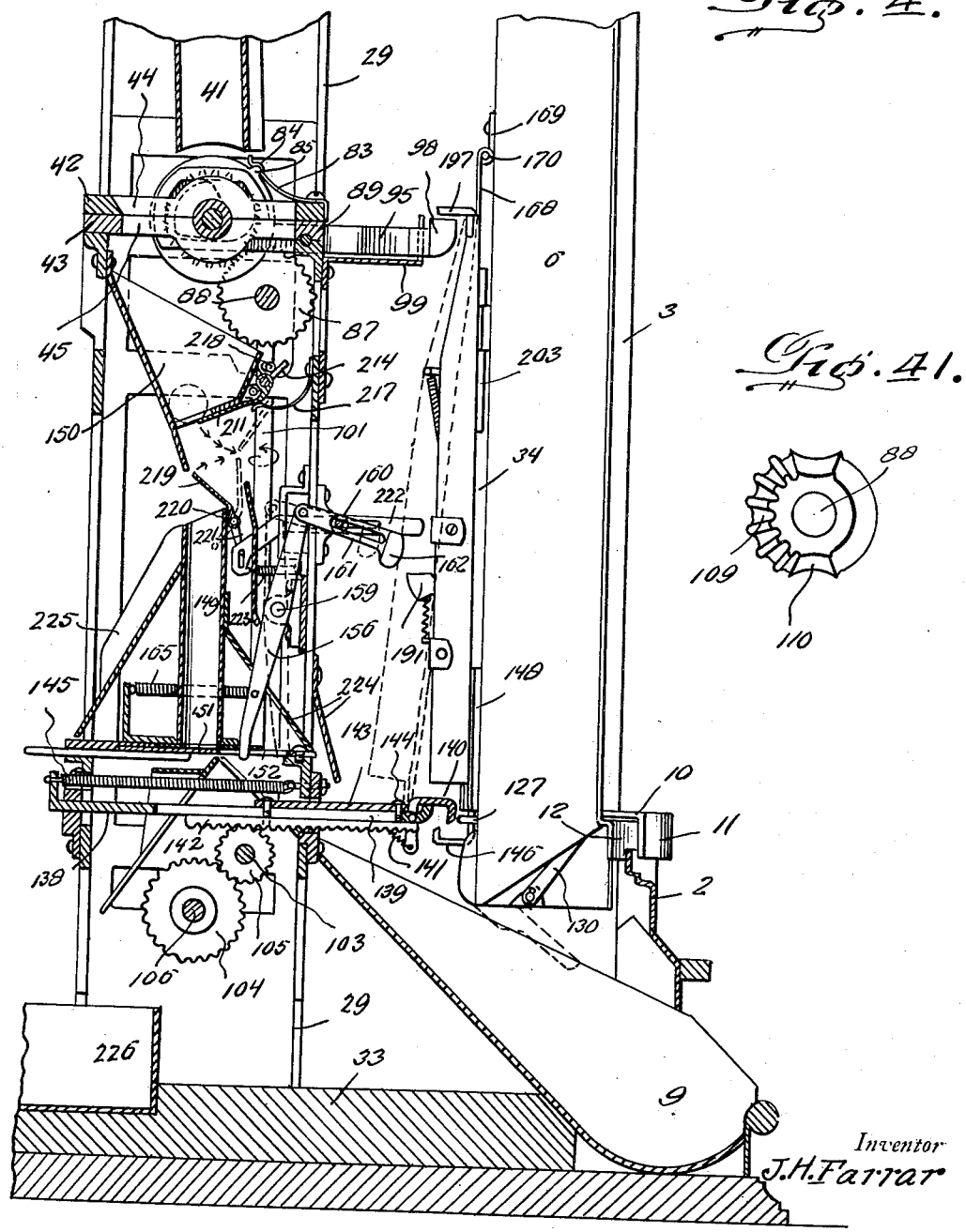

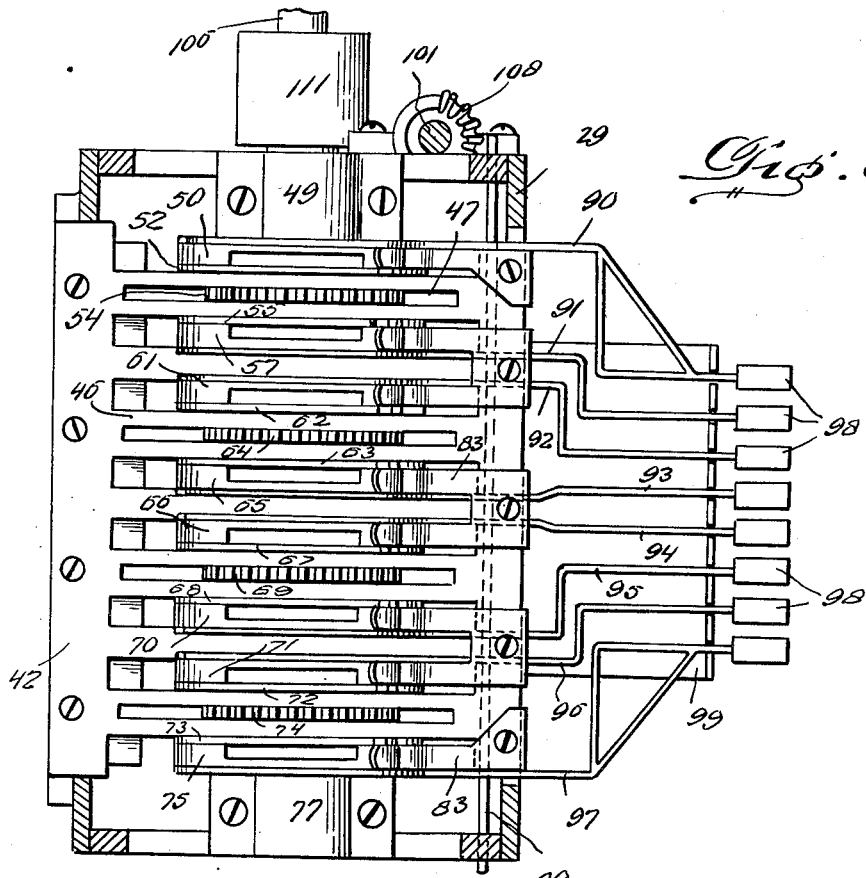
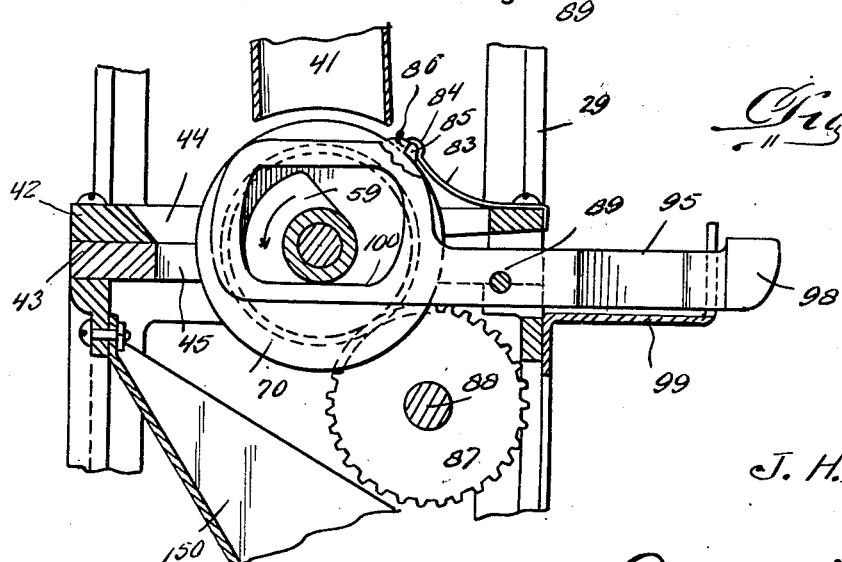

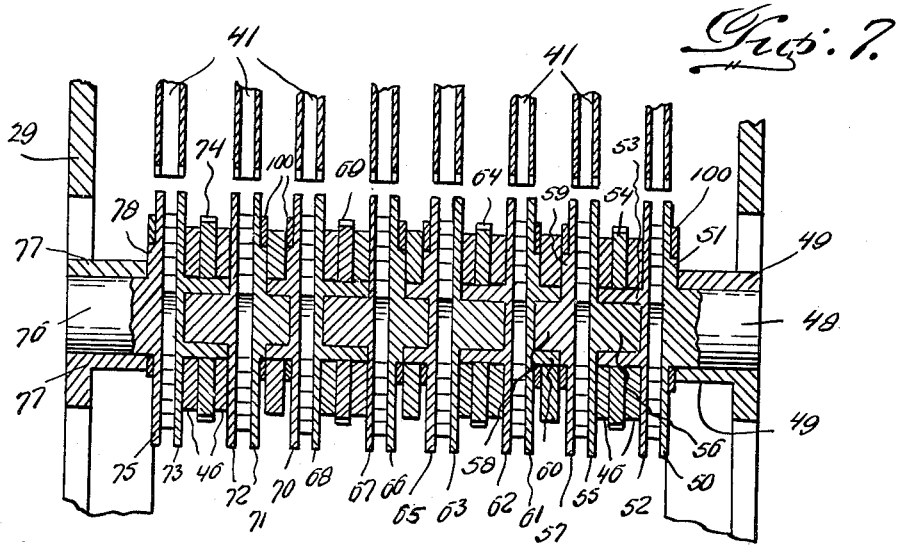
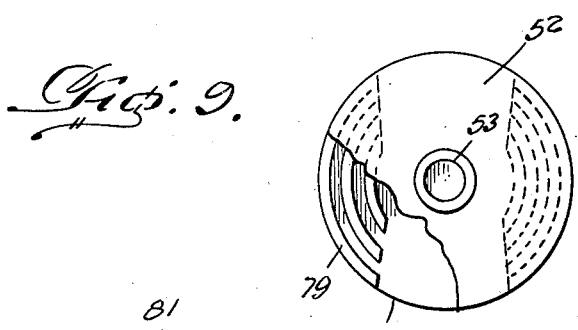
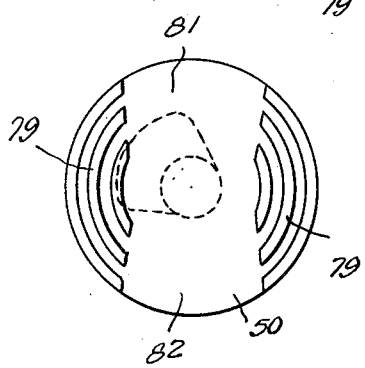
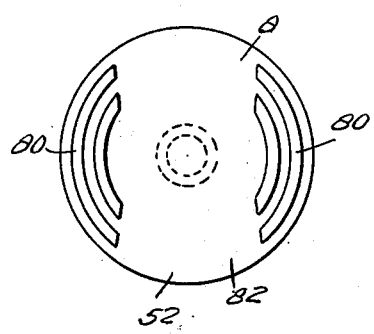

Dec. 9, 1930.  J. H. FARRAR  1,784,587
COIN CONTROLLED VENDING MACHINE
Filed Dec. 1, 1927  15 Sheets-Sheet 7
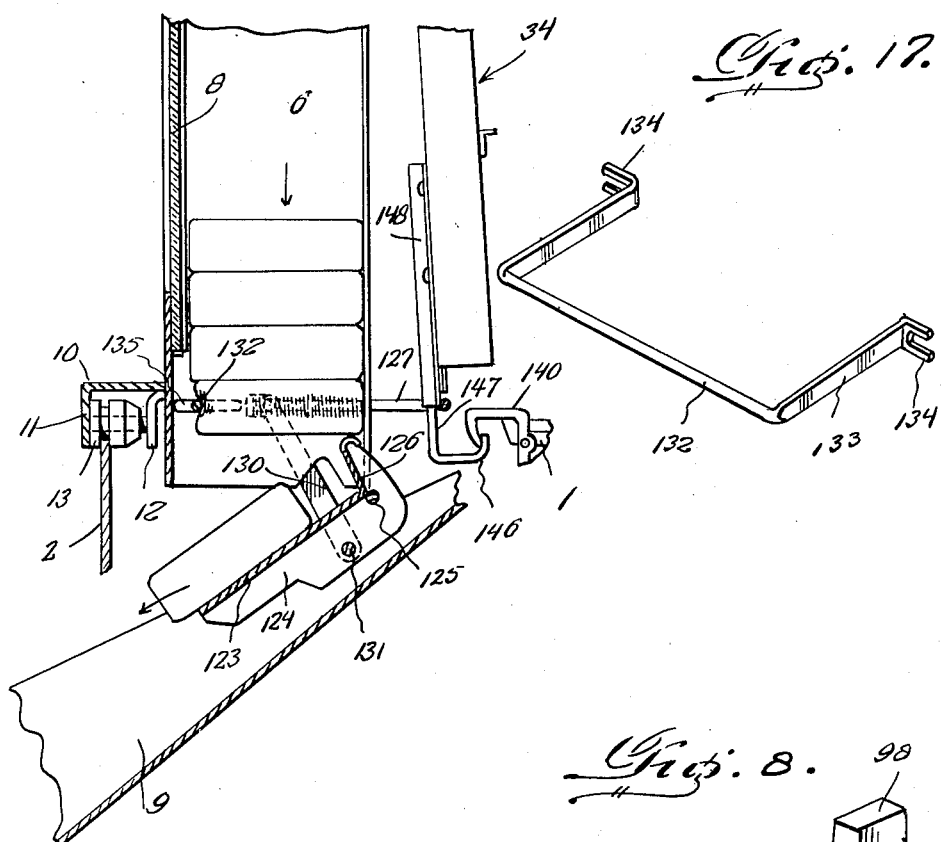

Inventor
J. H. Farrar
By Clarence A. O'Brien
Attorney

Dec. 9, 1930. J. H. FARRAR 1,784,587
COIN CONTROLLED VENDING MACHINE
Filed Dec. 1, 1927   15 Sheets-Sheet 9

Inventor
J. H. Farrar,

By Clarence A. O'Brien
Attorney

Dec. 9, 1930.  J. H. FARRAR  1,784,587
COIN CONTROLLED VENDING MACHINE
Filed Dec. 1, 1927   15 Sheets-Sheet 10
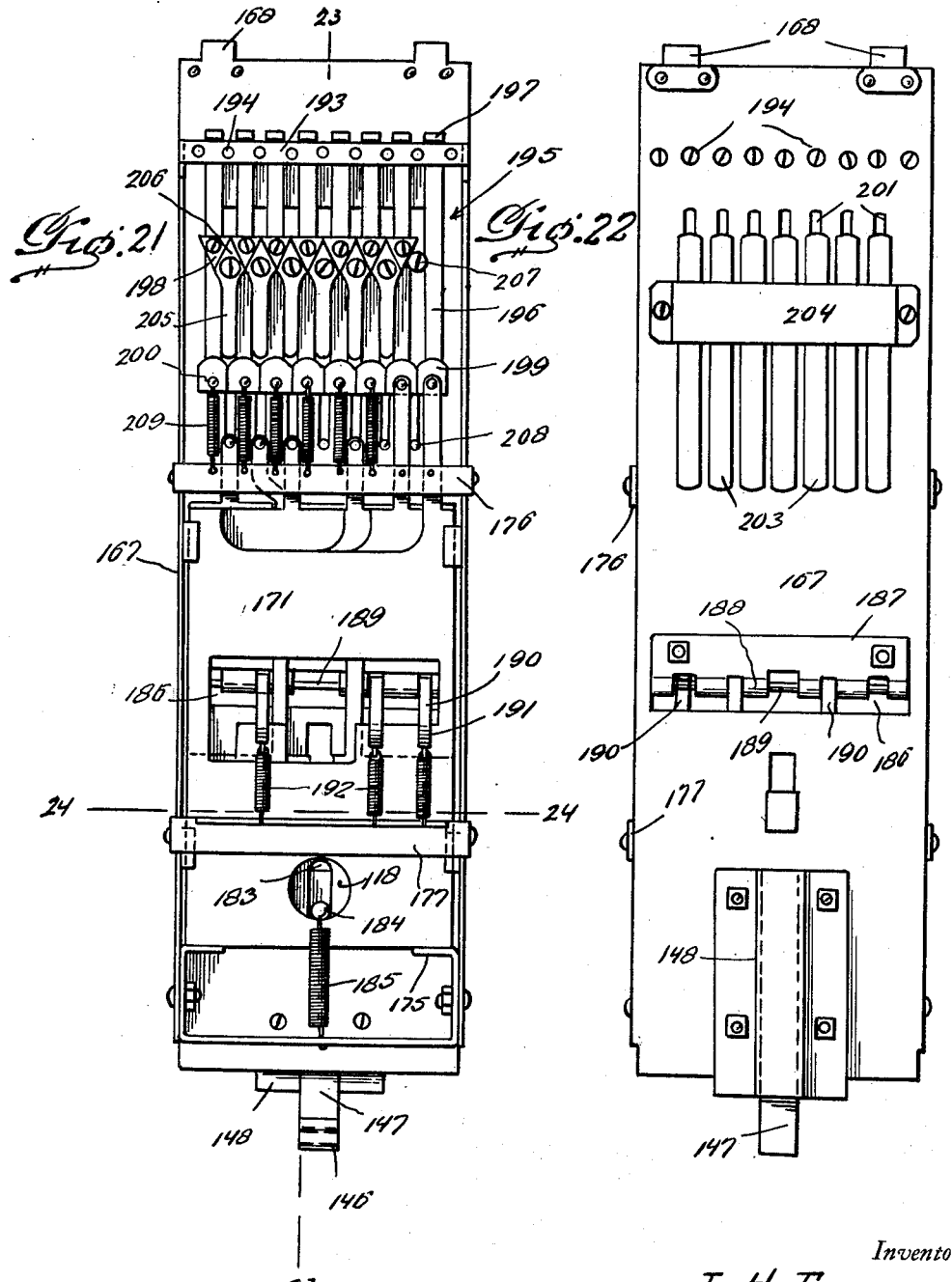
Inventor
J. H. Farrar,
By Clarence A. O'Brien
Attorney Dec. 9, 1930.  J. H. FARRAR  1,784,587
COIN CONTROLLED VENDING MACHINE
Filed Dec. 1, 1927   15 Sheets-Sheet 11
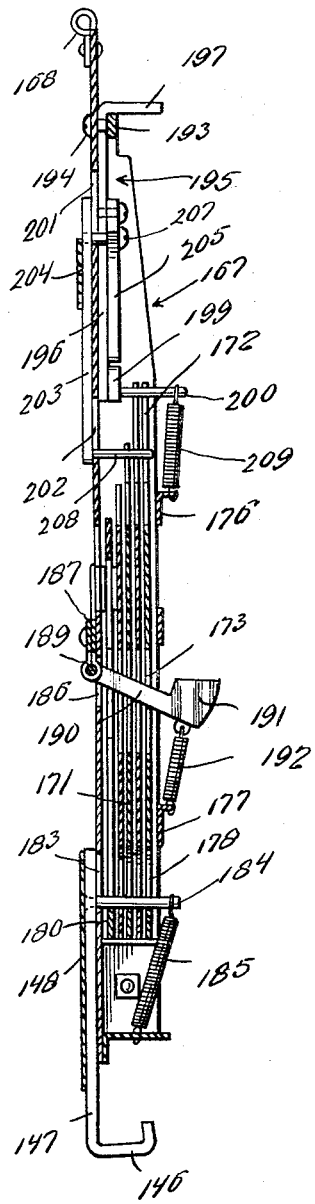
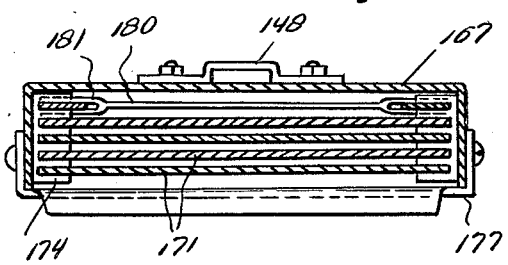
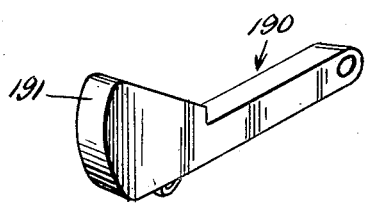
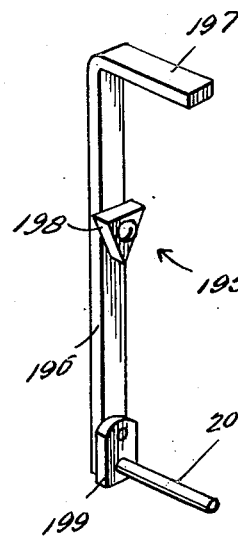
Inventor
J. H. Farrar,
By Clarence A. O'Brien
Attorney

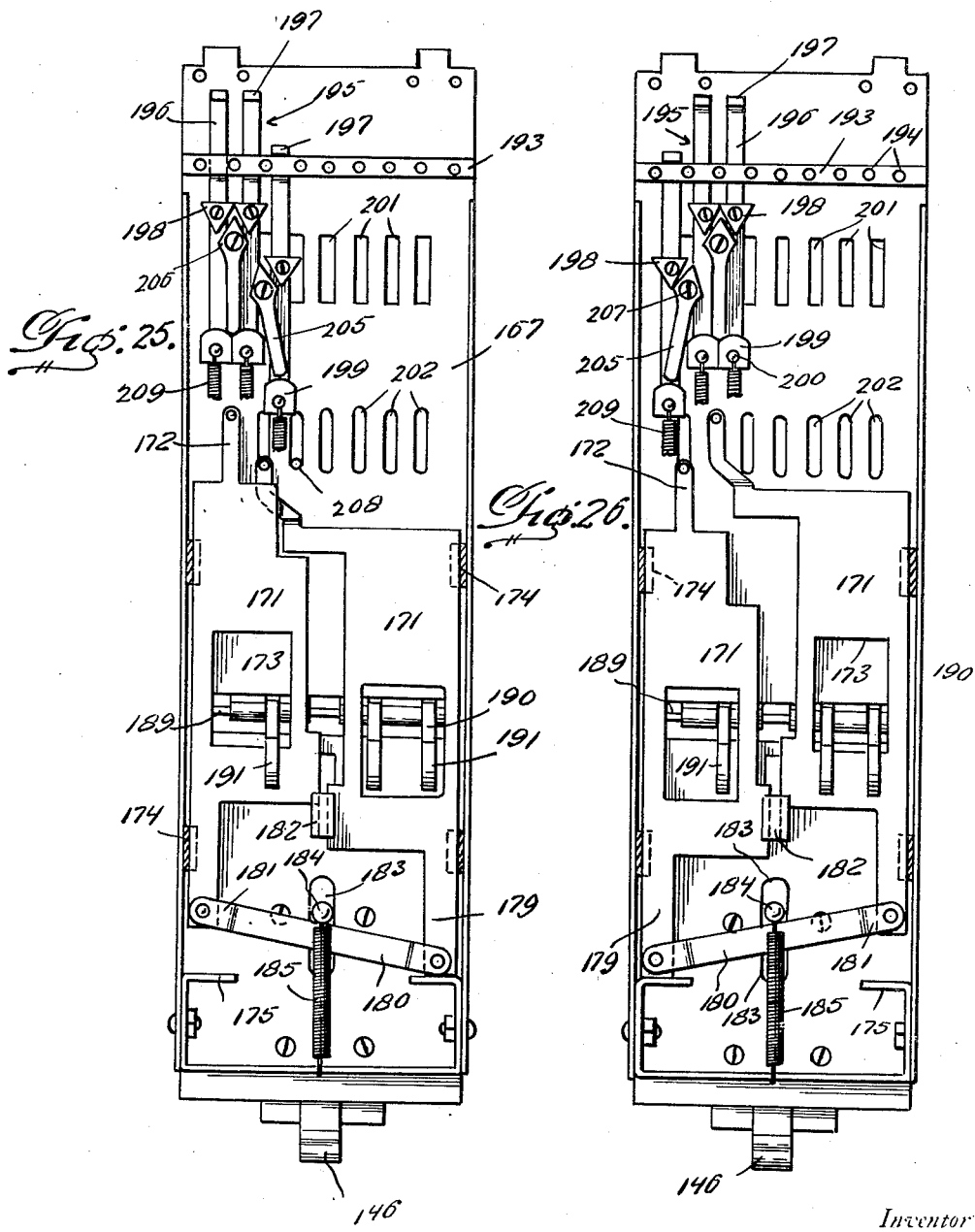

Dec. 9, 1930.    J. H. FARRAR    1,784,587
COIN CONTROLLED VENDING MACHINE
Filed Dec. 1, 1927    15 Sheets-Sheet 13

Inventor
J. H. Farrar,
By Clarence A. O'Brien
Attorney

Dec. 9, 1930.  J. H. FARRAR  1,784,587
COIN CONTROLLED VENDING MACHINE
Filed Dec. 1, 1927  15 Sheets-Sheet 14
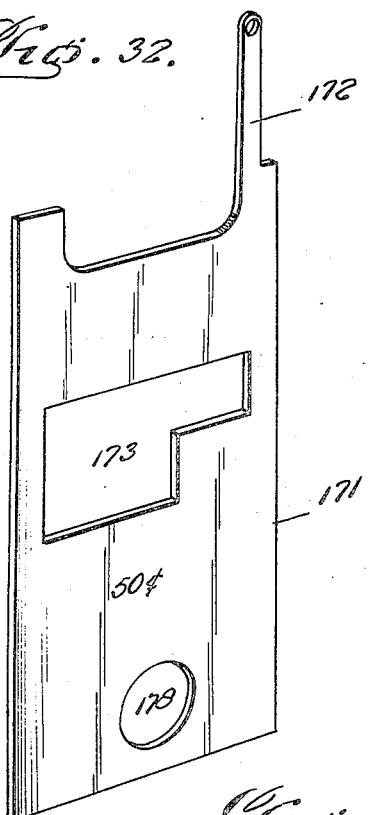
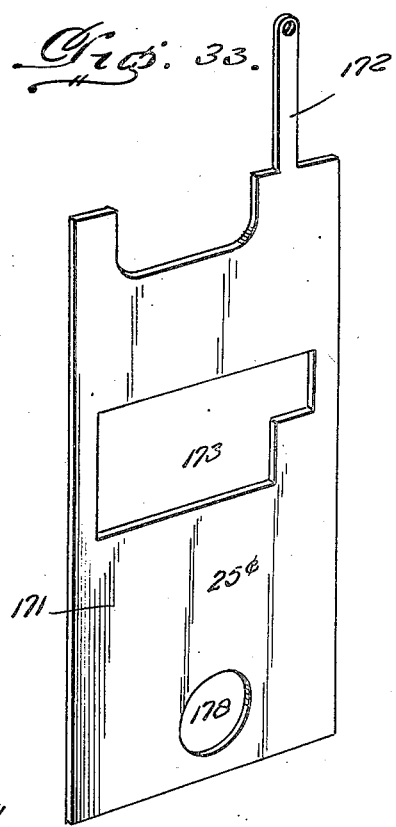
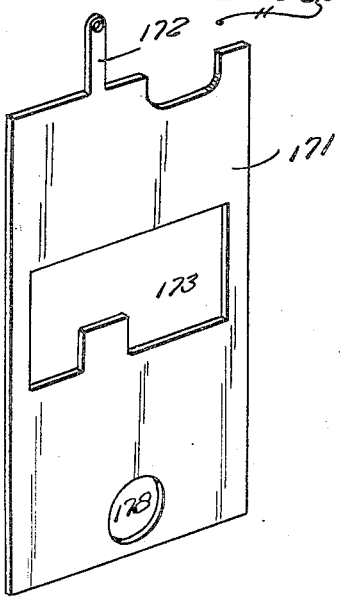
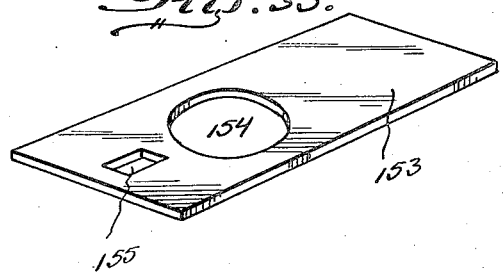
Inventor
J. H. Farrar,
By Clarence A. O'Brien
Attorney

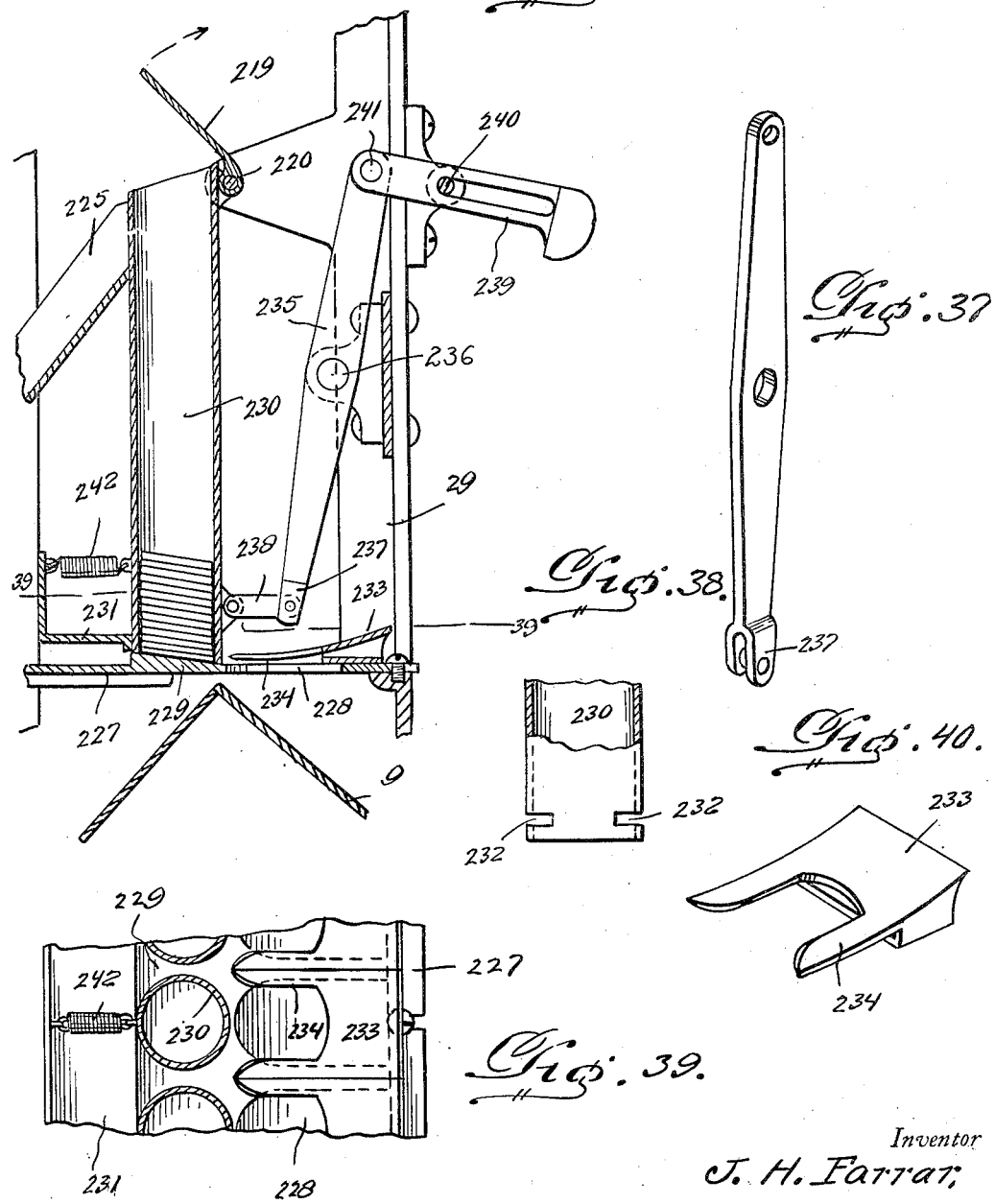

Patented Dec. 9, 1930

1,784,587

UNITED STATES PATENT OFFICE

JOHN H. FARRAR, OF MEMPHIS, TENNESSEE, ASSIGNOR TO STEPHEN J. GRAHAM, OF TUCKERMAN, ARKANSAS

COIN-CONTROLLED VENDING MACHINE

Application filed December 1, 1927. Serial No. 237,045.

The present invention relates to an improved coin controlled vending machine, and while it is designed as an improvement upon the construction disclosed in the patent to W. F. Donathan No. 1,619,246, March 1, 1927, it embodies a great many departures therefrom as will fully hereinafter appear.

One of the important objects of the present invention is to provide a coin controlled vending machine which includes a revoluble casing or magazine holder that carries a plurality of magazines which are adapted to contain various articles or commodities that are put up in package form, for example such as cigarettes, candy, chewing gum and the like; the articles or commodities of one magazine being of a different price than the articles or commodities of another magazine whereby the machine is capable of vending articles having different sale prices.

Another important object of the invention is to provide a master unit that is arranged centrally of the revoluble casing or magazine holder, coin controlled mechanism being associated with the master unit and adapted for cooperation with the ejector associated with each magazine whereby the selected article may be dispensed from the machine upon the deposit of the proper amount in the machine.

A further object is to provide a change making mechanism for association with the master unit, and each of the magazines whereby the proper change will be returned to the purchaser or operator of the machine when a coin of a higher denomination than the cost of the selected article is inserted, each magazine carrying a change control unit that is so constructed as to return only the difference between the price of the article selected and a coin of a higher denomination inserted in the machine.

A still further and important object of the present invention resides in the provision of means to prevent the operation of the ejector when a coin of a denomination less than the price of the article selected is inserted in the machine, the coin deposited being returned to the operator in such an instance, thereby preventing any loss being sustained by the customer.

Another important object is to provide a means for prohibiting the actuation of the article delivery mechanism unless any one of the magazines is in direct alignment with the delivery chute, said locking means being automatically released when one of the magazines is in proper position with respect to the delivery chute.

A still further object is to provide a coin controlled vending machine of the above mentioned character which will at all times be positive and efficient in its operation, the same being further simple in construction, inexpensive, strong and durable and further well adapted to the purposes for which it is designed.

Other objects of the invention and advantages thereof will become apparent during the course of the following description.

In the accompanying drawings forming a part of this application, and in which like numerals indicate like parts through the same:

Figure 1 is a front elevation of my improved coin controlled vending machine, a portion of the base being broken away.

Figure 2 is a vertical sectional view therethrough the central or master unit being shown in elevation and looking at the front side thereof.

Figure 3 is a top plan view of the machine, the ornamental top or cover being removed to illustrate the change control units carried by the article holding magazine and to further disclose the relation between the master unit and the sectional revoluble magazine holder or casing.

Figure 4 is an enlarged fragmentary view partly in section and partly in elevation, showing the actuating means for the change control unit as well as the means for effecting the actuation of an ejector provided for one of the change holding tubes, and further illustrating the several deflectors and coin guide chutes forming a part of the present invention.

Figure 5 is a top plan of the coin controlled mechanism and the pivoted arms provided with finger engaging noses at their outer free ends for cooperation with certain parts of each of the change control units carried by the respective magazines.

Figure 6 is a vertical sectional view through the coin controlled mechanism for more clearly illustrating the inner ends of the pivoted laterally extending arms and the coöperating cams for effecting the actuation of said arms.

Figure 7 is a sectional view through the pairs of coacting discs of the coin controlled mechanism taken substantially at right angles to Figure 6.

Figure 8 is a detail perspective view of one of the arms showing the finger engaging nose at the outer forward end thereof and the enlarged looped portion at its opposite end.

Figure 9 is a side elevation of one pair of spaced complementary discs, one of said discs being partly broken away.

Figures 10 and 11 are details of the discs showing the arrangement of the curved ribs on the inner opposed faces thereof.

Figure 14 is a detail perspective view of one of the pivoted levers associated with each slidable ejector for the change holding tubes.

Figure 15 is a similar view of one of the slidable links associated with the upper end of each of the pivoted levers.

Figure 16 is a detail disclosing the hinged ejector plate provided for the open lower end of each article holding magazine, said ejector plate being shown in the act of discharging the lowermost package into the delivery chute; the spring controlled yoke or jaw for holding the next lowermost package during the downward swinging movement of the hinged plate being shown in its operative position.

Figure 17 is a detail perspective view of the package gripping yoke or jaw.

Figure 21 is a front elevation of the change control unit that is adapted to be associated with the fifteen-cent article holding magazine.

Figure 22 is a rear elevation thereof.

Figure 23 is a vertical sectional view taken substantially on the line 23—23 of Figure 21.

Figure 24 is a transverse section taken substantially on the line 24—24 of Figure 21.

Figure 25 is a view similar to Figure 21, parts being removed and showing only two of the vertically sliding five-cent fingers in a raised position as well as the complementary sliding plate in its raised position.

Figure 26 is a similar view showing two other of the three five-cent fingers in their raised position, and the complementary plate associated therewith being also in the raised position.

Figure 30 is a detail perspective view of one of the dogs associated with each change control unit which is provided with an enlarged nose at its free end for cooperation with the enlarged free end of the sliding links which are in turn associated with the change tube ejector operating levers.

Figure 31 is a detail perspective view of one of the sliding fingers.

Figure 12:
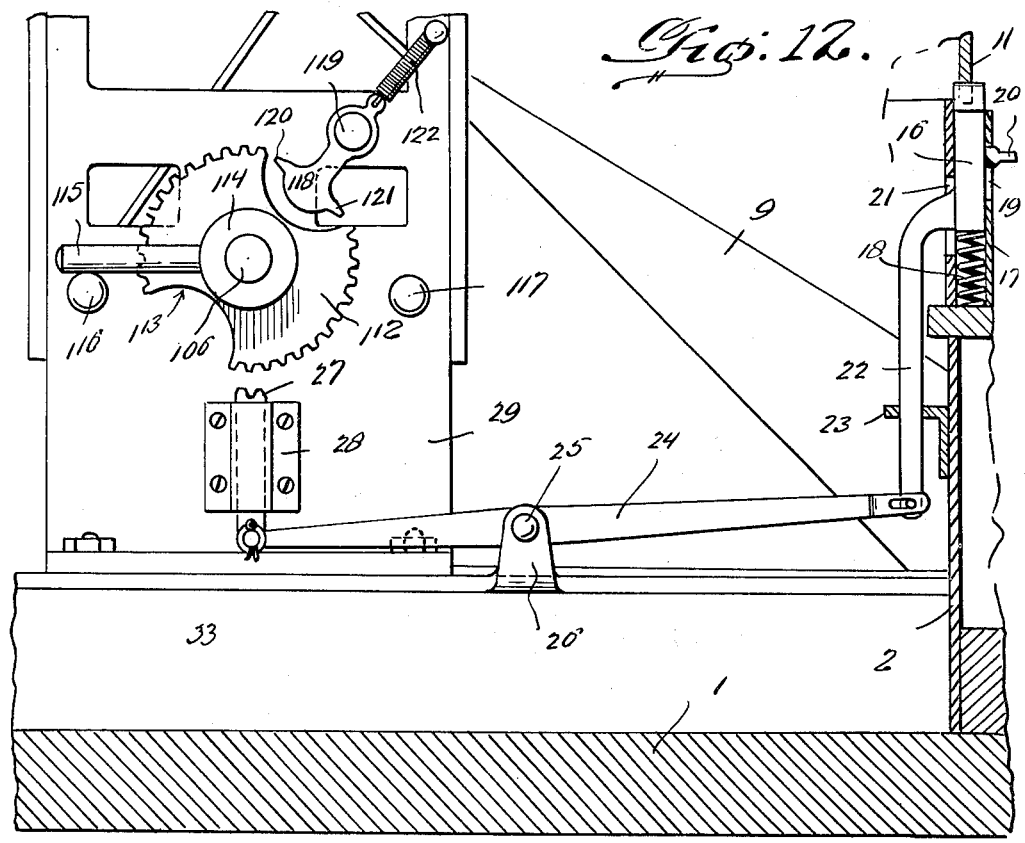
Figure 12 is an enlarged detail of the means for locking the article delivery mechanism in an inoperative position when the selected magazine is not in direct alinement with the delivery chute, the locking means being disclosed in a released position in this figure.

Figure 32 as well as Figures 33 and 34 are detail perspective views of the different sliding plates associated with each change control unit.

Figure 35 is a detail perspective view of one of the slidable ejectors provided for each change holding tube.

Figure 36 is a detail of a modification of the change holding tubes and the ejector means associated therewith, the change tube in the present instance being adapted for vertical swinging movement while the ejector member is stationary.

Figure 37 is a detail perspective view of the pivoted lever that is provided for effecting the swinging movement of the pivoted change holding tube.

Figure 38 is a fragmentary detail of the lower end portion of one of the change holding tubes showing the diametrically opposed slots formed in the same to accommodate the forked ejector.

Figure 39 is a sectional view taken substantially on the line 39—39 of Figure 36.

Figure 40 is a detail perspective view of one of the forked stationary ejectors, and Figure 41 is a detail of the gear carried by the horizontal shaft that is provided for actuating the coin controlled mechanism.

In the drawings, with reference more particularly to Figures 1, 2, 3, 4 and 12, respectively, the numeral 1 designates the base, and extending upwardly therefrom is the circular track 2.

Adapted for rotation on the base is the revoluble casing or magazine holder designated generally by the numeral 3. In the present instance the revoluble casing or magazine holder consists of a pair of complementary semi-circular sections 4 and 5, respectively, the same being connected together at their adjacent edges in any appropriate manner whereby the same can be easily and readily assembled or disassembled. When the complementary sections of the revoluble casing or magazine holder 3 are assembled, the same will form a polygonal shaped structure in top plan as is clearly disclosed in Figure 3. It is however understood that I do not wish myself limited to the particular shape of the casing or magazine holder.

Arranged on the inner side of each section of the revoluble casing or magazine holder 3 are a series of vertically disposed compartments or magazines 6. These magazines extend from the top of the casing to the bottom thereof and each side or face of the polygonal shaped casing is provided with the cut out portions 7. A glass panel 8 is disposed over each cut out portion on the inside of the casing. Suitable guides are provided for receiving and supporting the glass panels in position over the open front side of the respective compartments or magazine. This construction permits the merchandise to be displayed so that a prospective purchaser may rotate the casing until the desired article is disposed in vertical alinement with the delivery chute 9, the latter extending laterally from the base and the circular track 1 and 2, respectively.

The merchandise to be vended by the present machine is preferably put up in package form, and by providing a number of magazines or compartments, various articles may be dispensed from the machine, such as chewing gum, cigarettes, cigars, candy and the like. Furthermore, the machine embodying my invention is capable of dispensing articles that sell at different prices as will be hereinafter more fully described.

A laterally extending flange 10 is carried by the lower end portion of each of the complementary sections of the casing and the outer edge portion of these flanges is disposed downwardly as at 11. The lower edge portion of each of the complementary sections of the casing is furthermore so constructed at spaced intervals as to form depending brackets 12 that cooperate with the depending portion 11 of the lateral flange 10 to support the grooved rollers 13. The grooved rollers are adapted to travel on the upper edge of the track 2, and as is clearly illustrated in Figure 2, the depending portion 11 is disposed outwardly of the track, while the depending brackets 12 are arranged inwardly of said track.

In order that the polygonal shaped casing may be rotated on the track, I provide a plurality of knobs or handles 14, the same being carried by the sections of the casing. Thus a person may grasp any one of the handles and rotate the polygonal shaped casing on the track in order to bring the magazine carrying the desired article into alinement with the delivery chute 9.

A series of spaced notches 15 are formed in the lower edge of the depending portion 11 as is clearly illustrated in Figure 1. These notches are preferably arranged at the center of each of the article holding magazines or compartments and adapted for cooperation with these notches is a spring pressed latch 16, the same being arranged for vertical sliding movement in a suitable housing 17 provided therefor on the outer side of the circular track 2. The upper end of this housing is open and the upper end of the sliding latch is beveled so that the lower edge of the depending portion 11 may readily and easily ride over the beveled upper free end of said latch.

An expansible coil spring 18 is arranged within a housing 17 below the sliding latch and engages the bottom thereof for normally urging the same upwardly into engagement with the lower edge of the depending portion 11 and the notches 15 formed therein. The outer side of the housing 17 is provided with a longitudinal slot 19 through which extends a thumb engaging member 20 that is carried by the outer side of the latch 16 whereby said latch may be moved downwardly in its housing to disengage the same from the notched depending portion 11. The circular track that constitutes the rear portion of the housing is formed with an elongated slot 21 and extending therethrough is the upper curved end portion of a vertical arm 22. The upper curved end of this arm is secured to the latch for movement therewith while the lower end portion of this arm is slidable through a suitable bracket 23 arranged on the inside of the track 2. This is all clearly shown in Figure 12.

The lower end of this vertically movable arm 22 is operatively connected to the outer end of an elongated lever 24 that is fulcrumed intermediate its ends as at 25 in a suitable bracket 26. The opposite end of this lever is operatively connected to the lower end of a vertically sliding toothed bar 27 that is guided in a guide bracket or housing 28 open at its respective ends, and which bracket or guide is secured in a stationary manner on one side of the frame 29 that forms a part of the master unit structure which will be specifically described later. The purpose of the slidable latch 16 and the other elements cooperatively associated therewith will be presently apparent.

The magazines or compartments 6 are filled with packages to be vended from the top of the casing, and a suitable cover or top of any ornamental design such as is shown at 30 is removably secured on the upper open end of the revoluble sectional casing or magazine holder 3. The cover 30 is itself open at its upper end and an ornamental cap 31 is mounted thereon.

Arranged centrally within the rotatable casing or magazine holder 3 is a master unit designated generally by the numeral 32, the same comprising a frame heretofore referred to and designated by the numeral 29. This unit is rigidly secured at its lower end on a suitable block 33 that is carried by the central portion of the base 1.

A change control unit designated generally by the numeral 34 is associated with the inner face of the rear side of each article holding magazine 6, and the master unit 32 is so arranged with respect to these change control units 34 as not to interfere with the rotation of the sectional casing 3 whereby any one of the article holding magazines that may be selected can be properly positioned in alinement with the delivery chute 9.

The upper portion of the frame 29 forming a part of the master unit 32 extends beyond the top of the complementary sections comprising the revoluble casing or magazine holder 3, and into the cover 30.

Supported in the top of this frame 29 is a solid block 35, the same being formed with a series of longitudinally extending coin slots that are formed in the upper face of the block and extend from the forward to the rear end thereof. In the present instance, eight of such slots are provided. Three of the slots are so constructed as to receive only five-cent coins and these particular slots are denoted by the numeral 36.

A similar number of slots are constructed to receive only ten-cent coins and these particular slots are denoted by the numeral 37. The other two slots formed in the upper face of this solid block 35 are constructed for receiving twenty-five cent and fifty-cent coins respectively, and the same are designated by the numerals 38 and 39, respectively.

The forward ends of these slots cooperate with initial coin deposit slots 40 formed in the front side of the cover 30 and as is clearly illustrated in Figure 1, these initial coin deposit slots are of such size as to be capable of receiving five, ten, twenty five and fifty cent coins. As there are three slots formed in the block 35 for receiving five and ten cent coins respectively, there manifestly is a similar number of slots formed in the cover to cooperate with the respective slots in the block. Any suitable means may be provided for properly identifying the respective slots 40 so that the customer will not make a mistake when operating the machine.

The rear ends of the coin slots formed in the block 35 communicate with the coin chutes 41 that extend downwardly between the sides of the frame 29. Eight of such chutes are provided, and three of these chutes are adapted to cooperate with the three five-cent coin receiving slots 36. Three more of these chutes cooperate with the three ten-cent coin receiving slots 37 while the other two of the coin receiving chutes are adapted for cooperation with the twenty-five and fifty cent coin slots 38 and 39 respectively. The block 35 is inclined downwardly toward its rear end whereby the coins entering the respective slots formed in the upper face thereof will by gravity enter the respective chutes 41. The lower ends of these chutes are adapted for cooperation with a master coin controlled mechanism, the construction of which will now be more specifically described.

Said coin controlled mechanism comprises a pair of upper and lower plates 42 and 43 respectively, the same being secured together in the intermediate portion of the frame 29. These plates are formed with a series of transversely extending parallel spaced registering cut-out portions 44 and 45 respectively, as is clearly illustrated in Figures 4 and 5 of the drawings.

The portions of the plates between the registering slots or cut out portions 44 and 45 are enlarged at the intermediate or central portion of the plates as indicated at 46 with reference more particularly to Figure 7. The enlarged central portion 46 between each pair of registering slots is also slotted as illustrated at 47 in Figure 5. A relatively short shaft 48 is journaled for rotation between suitable bearings 49 arranged at one side of the frame 29 of said master unit 32. The inner end of this particular shaft carries a disc 50 and the outer face of this disc has arranged thereon what may be termed a cam forming portion 51 the purpose of which will be hereinafter more fully described. Cooperating with this particular disc is a similar disc 52, the same being provided on its outer face with a central sleeve 53. This sleeve is journaled for rotation in suitable bearings provided therefor by the central raised portions 46 of the upper and lower plates 42 and 43, respectively.

A spur gear 54 is secured on the sleeve 53 for rotation therewith and is adapted for disposition through the registering slots 47 formed in the central raised portions 46 as is further illustrated in Figure 7.

A disc 55 has formed on its outer face at the central portion thereof a cylindrical projection 56 that is fitted within the sleeve 53 of the adjacent disc 52 whereby said discs will rotate in unison.

This particular disc 55 is arranged in the next adjacent pair of registering openings 44 and 45 formed in the upper and lower plates 42 and 43 respectively, and in the same openings there is arranged a coacting disc 57, the same being formed on its outer face with a central cylindrical shaft forming projection 58. The outer face of this particular disc is formed with a cam 59 similar to the cam 51 formed on the outer face of the beforementioned disc 50. This central shaft forming projection 58 fits within a sleeve 60 that is formed on the outer face of a disc 61. Cooperating with the disc 61 is the disc 62, and the outer face of this disc has formed thereon a sleeve similar to the sleeve formed on the outer face of the disc 52 for receiving the central shaft-like projection formed on the outer face of the next adjacent disc 63. These last two mentioned discs 62 and 63 are secured together for simultaneous rotation, but are located in different cut-out portions formed in the upper and lower plates. A spur gear 64 similar to the spur gear 54 is secured on the sleeve associated with the disc 62 and rotates therewith, the central raised portions of the plates between the discs 62 and 63 being slotted to accommodate this gear.

Arranged within the same cut out portion as the disc 63 is a complementary disc 65, the same being formed on its outer face with a central sleeve for receiving the central shaft forming projection formed on the outer face of the next adjacent disc 66. The outer faces of these two discs are further formed with cams similar to the cams 51 and 59 formed on the discs 50 and 57 respectively, as well as the cam formed on the outer face of the disc 61. Arranged within the same cut out portions in the plates 42 and 43 as the disc 66 is a complementary disc 67 and this disc is of substantially the same construction as the discs 55 and 63, the same being formed with a central shaft forming projection on its outer face which fits in a sleeve formed on the outer face of the next adjacent disc 68 in the same manner as the projection 56 fits in the sleeve 53 of the disc 52 so that the discs 67 and 68 will operate in unison.

A spur gear 69 similar to the spur gears 54 and 64 is secured on the sleeve that is associated with the disc 68 and this gear rotates with these last mentioned pair of discs 67 and 68. Cooperating with the disc 68 is a disc 70 that is identical in construction with the disc 61 in that the outer face thereof is formed with a central sleeve, and with a cam similar to the cam formed on the outer face of the disc 61. A disc 71 is located in the next adjacent cut out portions formed in the upper and lower plates 42 and 43 and this disc 71 is provided on its outer face with a central shaft-like projection that enters the sleeve formed on the outer face of the adjacent disc 70 and also the outer face of this disc 71 is formed with a cam so that said disc is in reality of the same identical construction as the disc 60.

Arranged within the same cut out portions in the plates 42 and 43 as the disc 71 is a complementary disc designated by the numeral 72 and this disc is of the same construction as the disc 67 heretofore described, the same being formed with a central shaft-like projection on its outer face for cooperation with the central sleeve formed on the outer face of the next adjacent disc 73 which disc is of the same structure as the disc 68. These discs 72 and 73 are therefore adapted to rotate simultaneously and carried by the sleeve that is associated with the disc 73 is the spur gear 74, the same being of the same structure as the aforementioned spur gears and also the central raised portions of the plates are cut out to accommodate this last mentioned spur gear and this is clearly brought out in Figure 7.

Complementary to the disc 73 is the disc 75 which disc is formed on its outer face with a central enlarged shaft forming projection 76 similar to the shaft 48 formed on the outer face of the first mentioned disc 50. This shaft 76 is supported in the opposite side of the frame 29 in suitable bearings 77 and furthermore the outer face of the last mentioned disc 75 is provided with a cam 78 similar to the cam 51 formed on the outer face of the disc 50.

Formed on the inner opposed faces of each pair of coacting discs are the curved ribs 79 and 80, respectively. These ribs are so arranged as to provide an interfitting relation when the complementary discs are in position as shown in Figure 7. The opposed ends of the series of ribs arranged on the inner face of each disc converge gradually toward the center so as to form the coin receiving pockets 81 and 82 at the top and bottom respectively of each pair of discs. A pocket construction of this character will prevent the accidental displacement of a coin when the latter has been discharged from its respective chute by gravity into the proper pocket. It is of course to be understood that the coin receiving pockets formed in each pair of coacting discs are of such size as to be adapted to receive a coin of a predetermined denomination. These particular coin receiving pockets have heretofore been more fully described in the patent to Donathan #1,619,246, March 1, 1927.

As is further illustrated in Figure 7, the lower ends of the several coin delivery chutes 41 are positioned directly above the coin receiving pockets of the several pairs of coacting discs. Furthermore, the several shaft-like projections and the complementary sleeves formed on the outer faces of the discs will in reality provide what may be considered as a broken shaft, the parts being connected together for rotation in unison when a coin is inserted. The manner in which the complementary pairs of discs operate will be more fully described later on in the description of the operation of the machine.

A plurality of spring clips or fingers designated by the numeral 83 are secured at the forward edge portion of the upper plate 42 in the manner as clearly illustrated in Figures 5 and 6, and the free end portions of these spring fingers are curved upwardly and are formed with detents 84 for receiving a transverse tooth 85 formed on the peripheral face of the thickest one of each pair of coacting discs. The thickest ones of each pair of discs are those which have the ribs 79 formed on the inner face thereof, and in the present instance, these particular discs are denoted by the numerals 50, 57, 61, 65, 66, 70, 71 and 75.

The tooth on each of the aforesaid discs extend beyond the inner face of each of said discs so that the same will form an abutment or stop for the nose-like projection 86 formed on the peripheral edge of the complementary thinner disc.

The spring clips cooperate with the several teeth 84 and the adjacent nose-like projections 86 in limiting the rotary movement of each pair of complementary discs in a forward direction.

Adapted for cooperation with the spur gears 54, 64, 69 and 74, are similar spur gears 87 that are keyed or otherwise secured on a horizontal shaft 88 which is journaled for rotation in suitable bearings provided therefor in the frame 29 directly below the superposed plates 42 and 43 and slightly forwardly of the so-called broken shaft and this is clearly shown in Figure 6. The manner in which the horizontal shaft 88 is driven will be presently described in detail.

A rod 89 extends through the opposite sides of the frame 29 adjacent the front wall thereof and partially through the forward longitudinal edge portion of the lower plate 43 in the manner as clearly illustrated in Figure 4. Pivotally supported on this rod are the intermediate portions of a series of arm members, one of which is shown in detail in Figure 8. Eight of such arms are provided and the same are designated by the numerals 90, 91, 92, 93, 94, 95, 96 and 97, respectively. These arms have their forward end portions so bent as to be all disposed in parallel spaced relation with respect to one another and carried by the outer free end of each arm is the enlarged nose shaped head 98, the function of which will also be presently apparent. A slotted bracket 99 is arranged on the front side of the frame 29 of the master unit 32 for supporting the outer or forward ends of these arms in a horizontal position, it being understood of course that this bracket is so constructed as to permit the free upward swinging movement of the forward ends of the arms when the same are selectively actuated.

The inner end of each arm is formed with an enlarged looped portion 100 and this looped portion is adapted to cooperate with the respective cam carried by the adjacent normally non-rotatable disc of each pair and the manner in which each of these cams cooperates with the respective looped portion 100 is clearly illustrated in Figure 6. The enlarged looped portion 100 of each of the arms is disposed against the outer face of the respective thickened sections of each pair of complementary discs, and this is clearly shown in Figure 5.

For the purpose of actuating the shaft 88, there is provided a vertical shaft 101 that is journaled in suitable bearings at one side of the frame 29 of the master unit 32. A bevel gear 102 is secured on the lower end of this shaft 101 and the same meshes with a similar bevel gear (not shown) that is secured on the outer end of a horizontal shaft 103, the latter being supported between the sides of the lower portion of the frame and this shaft is in turn rotated through the medium of the intermeshing gears 104 and 105, respectively. The gear 104 is secured on the intermediate portion of a horizontal drive shaft 106, the inner end of which extends beyond one side of the frame at a point below the shaft 103, while the outer end of the drive shaft 106 extends outwardly through the side of the circular track 2 in the manner as clearly shown in Figure 2.

An operating handle 107 is secured on the outer end of the drive shaft 106 and this handle is capable of being moved about a 180° arc.

A beveled gear 108 is secured on the upper portion of the vertical driven shaft 101 and as is clearly shown in Figure 5, the teeth of this particular gear do not extend around the entire periphery of the gear member. This gear 108 is adapted for cooperation with a gear 109 that is secured on the outer end of the horizontal driven shaft 88 and as is clearly shown in Figure 41, this particular gear also has only a portion of its periphery formed with teeth and at the ends of the teeth the peripheral portion of the gear member is slightly cut away as indicated at 110. The diametrically opposed cut out portions 110 will cooperate with the smooth peripheral portion of the gear member 108 to provide a lock between the gears and prevent rotation of the respective shafts at certain intervals.

A rather heavy coil spring 111 is associated with the horizontally extending drive shaft 106 for returning the drive shaft and the driven shaft operatively connected thereto to their initial positions.

Secured on the inner end portion of the horizontal drive shaft 106 for disposition adjacent the opposite side of the lower portion of the frame 29 is the spur gear 112, the same being provided at diametrically opposite points with the enlarged cut out portions 113. This is clearly illustrated in Figure 12. A collar 114 is secured on the extremity of the drive shaft 106 adjacent the outer side of the notched gear 112 and extending laterally from the collar is the pin 115. This pin is adapted for cooperation with a pair of opposed abutments 116 and 117 respectively that extend outwardly from the side of the frame 29. The pin and the abutments cooperate to limit the swinging movement of the shaft 106 so that the same can only move in the arc of 180°.

Adapted for cooperation with the cut out portions 113 is the pawl 118, the same being pivotally supported on the frame as at 119 with reference also to Figure 12. This pawl is formed with a pair of opposed laterally extending teeth 120 and 121 respectively for cooperation with the teeth of the spur gear 112 on opposite sides of the cut out portion 113 and manifestly when the drive shaft 106 is actuated, the tooth 120 will engage the teeth on one side of the cut out portion 113 to prevent retrograde movement of the drive shaft and obviously when the drive shaft moves in the opposite direction, the opposite tooth 121 will cooperate with the teeth of the spur gear on the other side of the cut out portion to prevent retrograde movement. A spring 122 is associated with the pivoted end of the pawl 118 for maintaining the same in proper position so that normally the pawl will be disposed in one of the cut out portions 113 in the manner shown in Figure 12 of the drawings.

Referring now to the ejector mechanism which forms an important part of the present invention, it will be observed that the lower end of each article holding magazine or compartment is open. A plate-like member 123 provides a closure for the open lower end of each compartment or magazine and this plate is provided at its sides with depending flanges 124. A rod 125 extends through these depending flanges 124 at the rear edge portion of the plate and this rod is carried by the lower rear side portion of each magazine whereby to provide a hinged connection between the plate and the lower rear edge portion of the magazine. Furthermore, the rear edge portion of the plate is disposed upwardly to provide a back wall 126 as is clearly shown in Figure 16.

Figure 20:
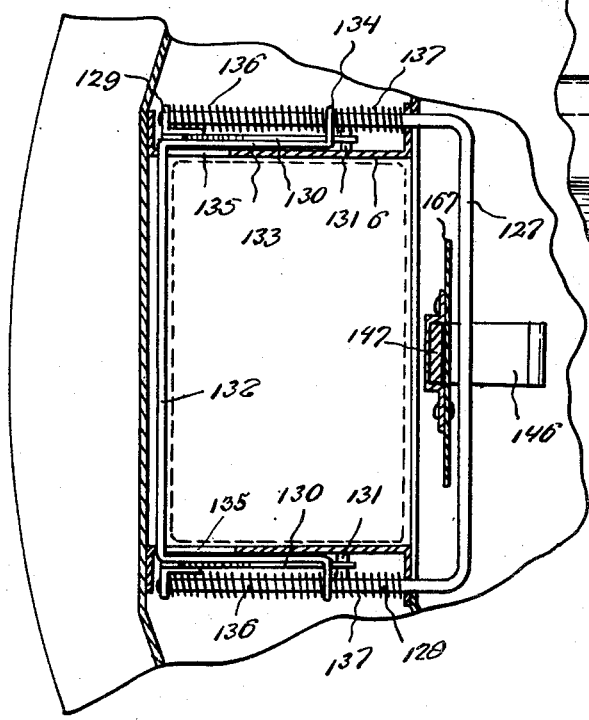
Figure 20 is a top plan view of the hinged plate actuating mechanism and also the package gripping yoke or jaw, the parts being shown in their inoperative position.

A substantially U-shaped yoke member 127 is provided for each of the magazines and the arms 128 of each of said U-shaped yokes extend forwardly through suitable openings provided therefor in the inner wall of the complementary sections comprising the sectional revoluble magazine holder, and as is clearly shown in Figure 20, the arms of each yoke are disposed on opposite sides of the respective magazine. An angular bracket 129 is carried by the forward free end of each arm 128 and cooperating with these brackets are the upper ends of a pair of link forming bars 130, the same being disposed on opposite sides of the lower end portion of each magazine as also clearly shown in Figure 20. The lower ends of these link forming bars 130 are operatively connected to the respective ends of a rod 131 that extends beneath the plate 123 and through the intermediate portions of the depending side flanges 124. This will provide an operative connection between the sliding yoke 127 and the hinged ejector plate 123 whereby said elements will move in unison.

A reversely arranged substantially U-shaped yoke 132 is also associated with each of the article holding magazines, and as is more clearly shown in Figure 17, the arms 133 of this yoke are flattened, and the free ends of these flattened ends are disposed outwardly to form lateral ears 134 and these ears are bifurcated for the purpose of accommodating the respective arms 128 of the complementary U-shaped yoke 127.

The sides of each magazine are formed with registering slots 135 adjacent the lower front edge portion as is more clearly shown in Figures 16 and 20 to accommodate the package gripping yoke 132 and the flattened arms 133 are disposed between the respective sides of each magazine and the adjacent link bars 130.

The arms 133 of the package gripping yoke 132 are of a length less than the length of the arms 128 therefore the laterally extending ears 134 are normally spaced from the rear wall of each magazine. An expansible coil spring 136 encircles the free end portion of each arm 128 and each of these springs is disposed between the respective angular bracket 129 and the adjacent laterally extending ear 134 formed on the free end of each of the arms package gripping yoke 132. An additional expansible coil spring 137 encircles the intermediate portion of each arm of the yoke 127 and as is clearly illustrated in Figure 20, these last mentioned springs are disposed between the opposite faces of the respective laterally extending ears 134, and the rear wall of the magazine.

The springs 137 normally urge the package gripping yoke 132 forwardly in the magazine so that the same is spaced from the front side of the packages arranged in stacked relation in each magazine, while the springs 136 normally urge the sliding yoke 127 forwardly so that the hinged plate 123 will be disposed in a substantially horizontal position to form a closure for the lower open end of each magazine, and when in such position, the stacked packages will rest on the hinged plate.

With reference to the ejector actuating mechanism there is arranged for sliding movement in the lower portion of the master unit 32, a horizontal flat bar 138, the same being guided through suitable brackets provided therefor at the front and rear of the frame 29 in the manner as clearly illustrated in Figure 4. The major portion of this bar 138 is formed with a slot 139 and the same extends from a point adjacent the forward end in the manner as clearly shown in this particular figure of the drawings. The forward extremity of this bar is slightly curved upwardly and pivotally carried by this end of the bar is the hook shaped member 140, and the purpose thereof will be hereinafter fully set forth. A coil spring 141 normally holds this pivoted hook member 140 in the position shown in Figure 4.

A rack bar 142 is arranged for slidable movement along the under side of the bar 138 and arranged for sliding movement along the upper face of this bar 138 is the flat strip 143, the same being connected to the rack bar 142 by means of the spaced screw members 144, the same extending through the slot 139 and being free to operate therein. This will provide a means whereby said rack bar is capable of moving independently of the sliding bar 138 as well as being capable of being moving simultaneously therewith.

The teeth of this rack bar 142 are at all times in engagement with the spur gear 105 that is secured on the horizontally disposed driven shaft 103 and manifestly when the drive shaft 106 is actuated by operating the handle 107, the rack bar 142 will be moved independently of the bar 138 in a rearward direction. However, when the rearward most threaded pin 144 reaches the end of the slot 39, the same will cause the bar 138 to also move rearwardly simultaneously with the further rearward movement of the rack bar 142. The purpose of this particular operation will also be presently described. A retractile coil spring 145 is connected to the rear end portion of the sliding bar 138 at one end and to the frame 29 at its opposite end for the purpose of normally holding the sliding bar 138 in its forward most position.

The hook shaped member 140 is adapted for cooperation with the hook shaped foot 146 that is formed on the lower end of a vertical flat bar 147 that is slidably associated with each of the change control units 34, this bar member 147 being arranged in a suitable housing 148 provided therefor on the rear side of the lower end portion of each change control unit. The lower portion of this vertical sliding bar 147 extends downwardly within the U-shaped yoke 127 and is adapted to engage the central portion of the crown or base portion of this particular yoke in the manner as clearly shown in Figures 16 and 20.

The invention further comprehends the provision of means for returning change to the customer when a coin of a higher denomination than the price of the article selected is inserted in the machine and to this end, there is provided a series of change holding tubes such as is shown at 149 with reference now to Figures 2 and 4 of the drawings.

In the present instance, there is provided five change holding tubes. Two of these tubes are adapted to receive five-cent coins, another two of the tubes are adapted to receive ten-cent coins while the remaining tube is adapted to receive twenty-five cent coins. These change tubes are arranged vertically below the coin controlled mechanism and are mounted in a stationary manner in the frame comprising the master unit 32. Suitable guide chutes are interposed between the coin controlled mechanism and the upper ends of the coin receiving tubes 149 as is indicated at 150 with reference to Figure 4 and these chutes will by gravity deliver the coins that are inserted in the machine from the coin controlled mechanism or more particularly from the coin receiving pockets of the several pairs of coacting discs to their respective change holding tubes. It is of course to be understood that these change holding tubes are initially partially filled with coins of the proper denominations so that the proper change will be returned to the customer at all times.

The lower end of each change holding tube is open and a mount plate 151 is arranged below the change holding tubes and this mount plate is formed with a series of coin discharge openings such as are shown at 152 in the forward edge portion thereof. These openings are so arranged as to cooperate with the respective change holding tubes, and furthermore communicate with the inner portion of the upwardly inclined delivery chute 9.

A sliding ejector plate such as is shown at 153 with reference more particularly to Figure 35 is provided for each change tube, the same being adapted for sliding movement beneath the lower end of each tube and on the upper face of the apertured mount plate 151. Each plate is formed with a coin receiving opening 154, and it is of course to be understood that the openings in the ejector plates 153 are of such size as to receive a single coin of the respective change holding tubes.

The forward end portion of each ejector plate 153 is formed with the substantially rectangular opening 155 into which extends the lower end of an actuating lever 156 in the manner as also clearly shown in Figure 4.

This lever is more specifically shown in Figure 14 and it will be observed that the lower end thereof is slightly offset as indicated at 157 and the offset portion enters the rectangular opening 155 in the respective change ejector plate.

As there are five change holding tubes, there obviously must be five levers and each lever is formed with an enlarged central portion that is provided with an opening 158 to accommodate the transversely extending shaft 159 that is journaled in suitable bearings carried by the front side of the frame in the manner as shown in Figure 4. This construction provides a means whereby the levers 156 are pivotally supported intermediate their ends and it is of course understood that spacing sleeves are arranged on the shaft 159 between the levers to properly maintain the same in position.

An additional transverse shaft 160 is journaled or supported in suitable bearings arranged on the front of the frame 29 above the aforementioned shaft 159 and mounted on this shaft or rod 160 for sliding movement in a forward and rearward direction are a series of links such as are shown at 161. In Figure 15 of the drawings, there is shown a detail perspective view of one of these links.

Figure 13:
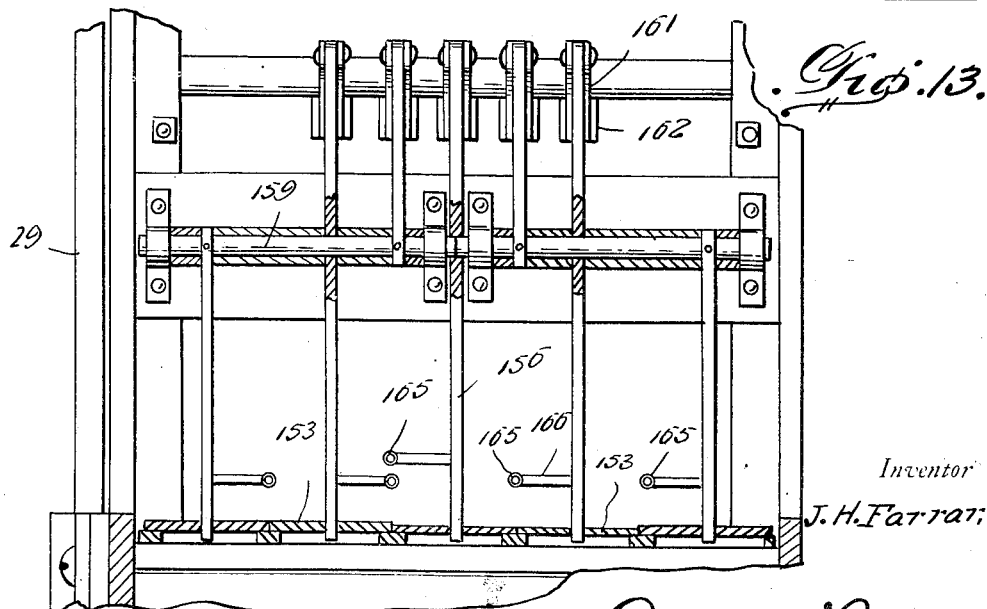
Figure 13 is a view disclosing the slidable ejector plates provided for the several change holding tubes and the actuating levers associated therewith.

Each link consists of a solid bar that is formed at its forward end with an enlarged head 162. The bar is furthermore formed with a longitudinally extending slot 163 to accommodate a transverse shaft or rod 160 while the rear end of the bar is bifurcated as illustrated at 164 with reference more particularly to Figure 15 to accommodate the upper end of the respective pivoted lever 156. A pivot pin extends through suitable registering openings provided in the furcations formed at the inner end of each link and a similar opening formed in the upper end of the respective lever 156 whereby a pivotal connection is provided between each of the levers and its adjacent link. Suitable spacing sleeves are arranged on the shaft 160 for disposition between the several links, thereby maintaining the same in proper position. The links and the adjacent levers are normally maintained in the position shown in Figure 4 by suitable contractile coil springs such as are shown at 165. The springs 165 furthermore will maintain the slidable ejector plates 153 in their normally inwardly moved position so that the openings in the ejector plates are in alinement with the respective change holding tubes and each plate will therefore hold a single coin in its opening. Laterally extending pins 166 are associated with the lower ends of the pivoted levers to facilitate the securing of the respective contractile coil springs 165 to the levers as is clearly shown in Figure 13.

The construction of the change control unit which constitutes a salient part of the present invention will now be taken up for detailed description. There is associated with each one of the article holding magazines or compartments 6, a change control unit that is designated generally by the number 34 and the units are constructed for cooperation with the slidable ejector plates that are cooperatively associated with the change tubes and as the articles of one magazine differ in price from those contained in another magazine, it is necessary to provide different combinations in order that the proper change may be given when a coin of a higher denomination than the price of the article selected is inserted in the machine.

In the present instance, I have shown details of the fifteen-cent change control unit, that is to say the unit which is adapted to be carried by the rear wall of the article holding magazine that contains articles whose selling price is fifteen cents.

Each change control unit comprises a casing 167, the same being open at its inner or front side as well as its upper end. A pair of ears 168 is carried by the upper edge of the casing 167, and these ears cooperate with similar ears arranged on the inner or rear wall of each article holding magazine as shown at 169 to receive the pivot pins 170 whereby the casing 167 is hingedly secured at its upper edge to the rear wall of each article holding magazine at a point slightly below the upper end thereof. The housing 148 that is provided for the foot carrying member 147 is secured on the outer face of the rear side of the casing 167 in the manner as clearly illustrated in Figure 22.

A plurality of plates such as are shown in Figures 23, 24, 32, 33 and 34 are arranged for slidable movement between the sides of the casing 167 in the lower portion thereof. These plates are designated generally by the numeral 171, and in certain instances, the plates are divided into sections as for example in Figures 25, 26, and 27, while in other instances, these plates are of a one-piece structure as shown in Figures 32, 33 and 34 respectively. The plate shown in Figure 32 represents what I term as the fifty-cent plate and the same is adapted for cooperation with the fifty-cent finger. The plate shown in Figure 33 represents the twenty-five cent plate for cooperation with the twenty-five cent finger while in Figure 34, the fifteen cent plate is clearly illustrated.

Each of the plates 171 is provided with an upwardly extending arm as shown at 172 and where the plates are formed in sections, the upper edge of each section is formed with an arm. Furthermore, the intermediate portion of each plate is provided with a cut out portion 173 and in the case of the sectional plates, each section is formed with a cut out portion as illustrated in Figures 25 to 27, inclusive.

The several plates are arranged for vertical sliding movement between the sides of the casing 167 and for the purpose of spacing the plates with respect to one another, there is provided the inwardly extending spacing elements 174, the same being carried by the respective sides of the casing. The lower edges of these plates normally rest on the brackets 175, the construction of these brackets is very clearly illustrated in Figures 25 to 27 inclusive. Upper and lower strap members 176 and 177 respectively extend across the open front side of the casing and the end portions of these strap members are disposed laterally and are secured to the respective sides of the casing in the manner clearly shown in Figures 21 and 22. The purpose of these strap members will be presently apparent.

Figure 27:
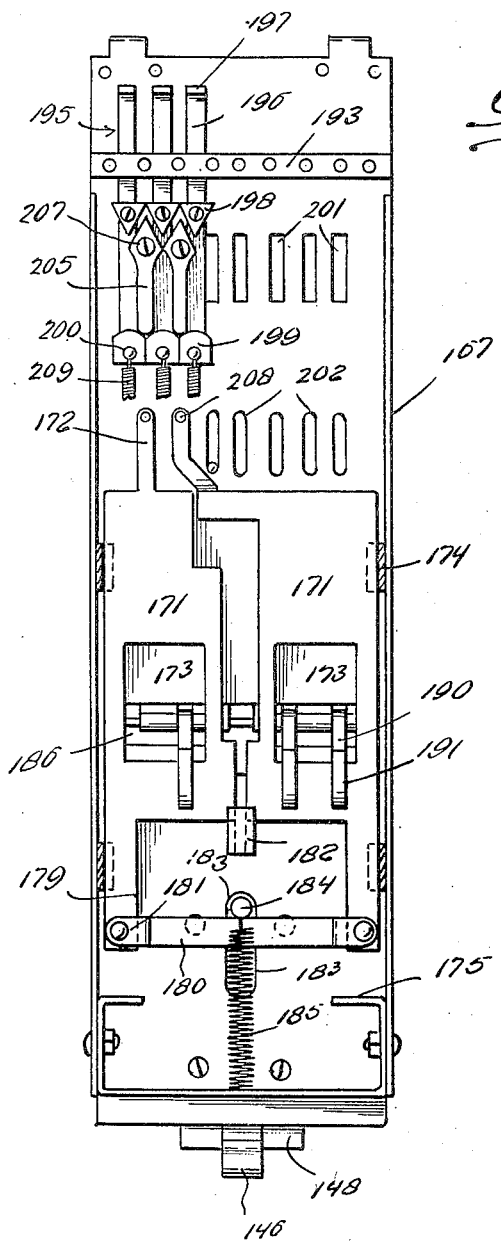
Figure 27 is a similar view showing all three of the five-cent fingers raised and the complementary plates also raised whereby the vertically sliding foot member of the change control unit is raised.

The whole plates 171 are formed with circular openings 178 in the lower central portion thereof, while the sectional plates have their lower edges cut away whereby to form what may be considered as depending legs 179 and this construction is clearly shown in Figures 25 to 27 inclusive. The depending legs 179 of the complementary sections are connected together by means of a cross bar 180, the same being formed at each end with a fork 181 and these forked ends are pivotally connected to the respective depending legs so that either section of the sectional plate may move independently of each other or may furthermore be adapted for simultaneous movement at certain times. A centrally located guide 182 is provided for the lower portions of the inner opposed edges of the sectional plates as clearly shown in Figures 25 to 27, inclusive.

The back side of the casing 167 is formed with an elongated slot 183 in the central lower portion thereof and adapted to extend through this slot and further adapted for vertical sliding movement therein is the laterally extending pin 184 that is carried by the upper end of the bar 147. This pin also extends through the circular openings 178 formed in the whole plates 171 and the cross bar 180 is located below the laterally extending pin 184.

A contractile coil spring 185 is secured at its upper end to the forward free end of the pin 184 and the lower end of this spring is secured to the bottom of the casing for the purpose of normally urging the slidable foot carrying member 147 downwardly and so that the pin 184 will rest at the bottom of the circular opening 178 formed in the whole plates 171. The back of the casing 167 is provided with a transverse opening 186 which is in registration with the cut out portions 173 formed in the sliding plates 171 as clearly disclosed in Figures 21 and 23. A strip 187 is secured on the outer face of the back side of the casing 167 directly above the cut out portion 186 and the lower edge of this strip is formed with a series of spaced looped portions 188 through which extends the rod 189. A series of dogs 190 are pivotally supported at their inner ends on the rod 189, three of such dogs being associated with the fifteen cent magazine change unit. The inner end portions of these dogs extend through the cut out portions 173 formed in the plates 171 and through the slot 186, and as is clearly shown in Figure 30 the forward or free end of each dog is provided with an enlarged nose 191, the purpose of which will be hereinafter more fully described.

The nose shaped head formed on the forward free end of each dog projects beyond the front side of the casing 167 and these dogs are normally held in a lowered position by means of the retractile coil springs 192 the same being connected at their respective ends to the lower strap member 177, and the forward end portions of the respective dogs as is clearly shown in Figures 21 and 23. A bar 193 extends transversely across the upper portion of the casing 167 and is spaced from the back wall of the casing. A series of machine screws 194 extend through the back of the casing and are threaded into suitable openings provided therefor in the bar 193, at spaced intervals.

Adapted for vertical sliding movement on the inner or front face of the back wall of the casing 167 are the elongated finger members 195. Each of these finger members comprises a flat bar 196, the upper end of which is bent laterally as at 197 with reference more particularly to Figure 31 wherein there is disclosed a detail view of one of the finger members. This forwardly extending finger 197 functions or cooperates with the finger engaging noses 98 as will be later described.

Each of these sliding finger members is slidable between the cross bar 193 and the rear wall of the casing 167, and as further shown in the drawings with reference more particularly to Figures 25 and 27, the finger members are arranged between these spaced screws 194. The laterally extending fingers 197 formed on the upper ends of the bars 196 of the finger members normally rest on the upper edge of the cross bar 193. A substantially triangular shaped plate 198 is secured on the front face of the intermediate portion of each bar 196 of the sliding finger members. Secured on the lower end of the bar is a substantially rectangular shaped plate 199, the upper edge portion of which is rounded as clearly shown in Figure 31. An elongated pin 200 is carried by this plate 199 and the same extends forwardly from the plate at substantially right angles thereto.

The back wall of the casing 167 of each change control unit is formed with a series of longitudinally extending slots 201 at a point slightly below the cross bar 193, and these slots are preferably arranged for disposition between the spaced sliding finger members 195. A similar series of slots 202 are also formed in the back wall of the casing below the first mentioned series 201 and these slots 202 are arranged in alinement with the slots 201 so as to be also located between the sliding finger members 195.

A plurality of elongated flat bars 203 are arranged for sliding movement on the outer face of the rear wall of the casing 167 and these bars are preferably arranged in a guide bracket 204 as is clearly shown in Figures 22 and 23. There are as many bars arranged for vertical sliding movement on the outer face of the rear wall of the casing as there are slots 201 and 202 respectively, and this is clearly shown in the drawing with reference also to Figure 22.

A dog 205 is formed at its upper end with a triangular shaped head 206 and this dog is pivotally supported on the upper end of each bar by means of the pivot forming screw 207 that extends through the arrow-shaped head 206. These pivots extend through the respective slots 201 so that the dogs 205 will be arranged for vertical sliding movement along the front faces of the sliding finger members 195 and furthermore these dogs are arranged between pairs of the sliding fingers.

Figure 28:
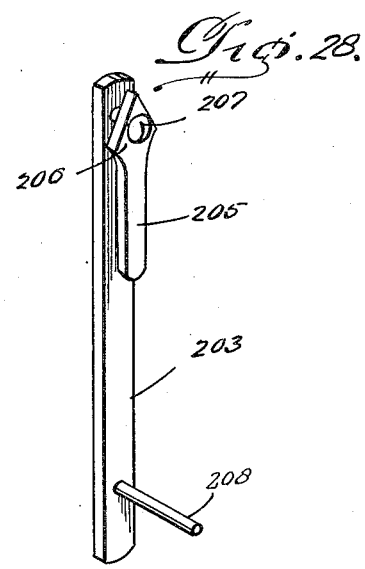
Figure 28 is a detail perspective view of one of the sliding bars and the pivoted dog associated therewith for cooperation with the vertically sliding fingers of the change control unit.
Figure 29:
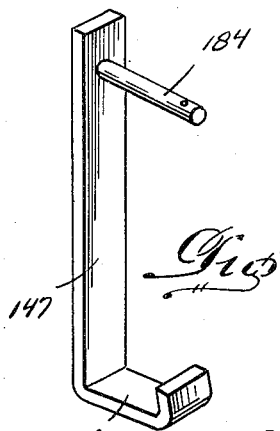
Figure 29 is a similar view of the foot member forming a part of each change control unit.

A laterally extending pin 208 is carried by the lower end portion of each sliding bar 203 and these pins extend through the lower series of slots 202 as clearly shown in the drawings. The specific construction of one of the sliding bar units is more clearly illustrated in Figure 28.

Certain of these laterally projecting pins 208 are operatively connected to certain of the sliding plates 171 and to this end the upper ends of the arms 172 that are carried by said particular plates are formed with openings to receive the pins. The other upstanding arms that are associated with the fifty and twenty five cent plates are operatively connected to the laterally projecting pins 200 that are carried by the lower ends of the sliding finger members 195 provided for the last mentioned sliding plates. This construction is very clearly shown in Figure 21 of the drawings.

A plurality of contractile coil springs 209 are connected at their lower ends to the upper transverse strap 176, the upper ends of these springs being connected to the outer ends of the laterally projecting fingers 200 carried by the lower ends of the finger members 195 and only those sliding finger members that are operatively connected to the twenty-five and fifty cent plates do not have springs 209 associated therewith.

The coin delivery chute 150 is divided into independent compartments by means of the partitions 210 and the bottom of each hopper or compartment is open. A hinged closure 211 extends across the open lower ends of the several hoppers or compartments of the coin chute 150 and this closure plate is carried by a transverse shaft 212 that is supported between the sides of the frame 29 of the master unit 32. As is more clearly shown in Figure 4, the rear side of the coin chute extends materially below the front side.

Figure 18:
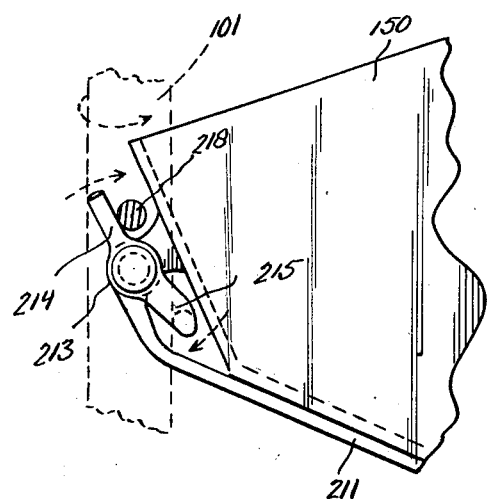
Figure 18 is a vertical sectional view taken substantially on the line 18—18 of Figure 19 looking in the direction of the arrows for illustrating the means to effect the downward swinging movement of the hinged plate provided for the upper coin receiving chute.
Figure 19:
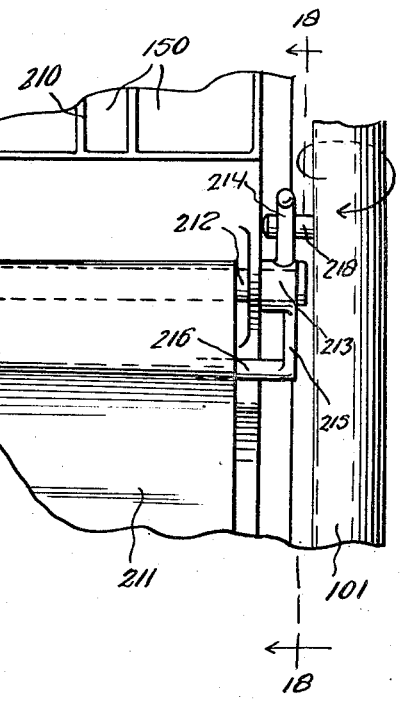
Figure 19 is a further illustration of said means.

A collar or sleeve 213 is loosely mounted on one end of the shaft 212, and this sleeve is formed at diametrically opposite points with the radial arms 214 and 215 respectively with reference more particularly to Figures 18 and 19. The lower end of the arm 215 is formed with a laterally extending finger 216 for cooperation with the hinged closure plate 211 to effect the swinging of the same to an open position in the manner hereinafter to be more fully described.

A leaf spring 217 is provided for normally urging the closure plate 211 in a closed position against the open lower ends of the respective compartments of the coin chute 150. Adapted for cooperation with the upper arm 214 is the laterally projecting pin 218 that is carried by the vertical driven shaft 101 and normally this pin engages one side of the arm as clearly shown in Figures 18 and 19 of the drawings.

The open lower ends of the several hoppers or compartments formed in the coin chute 150 are disposed directly over the respective change holding tubes 149. A deflector 219 is pivotally supported above the upper open ends of the change holding tubes as at 220 and normally this deflector extends across all of the change holding tubes and is disposed in the manner shown in Figure 4 so that the coins cannot enter the change holding tubes 149. A link 221 is secured to the rod 220 that provides the pivotal connection for the deflector plate 219 and this depending link 221 cooperates with the inner slotted end of a laterally extending arm 222 that is slidably mounted on the rod 160 and the forward free end of this arm is adapted to be disposed within the path of the rearward swinging movement of each of the change control units as will be presently more fully described.

A retractile coil spring is associated with this sliding arm 222 for normally holding the same in the position shown in Figure 4 whereby it can be actuated by the rearward swinging movement of one of the change control units. This spring is designated at 223.

A series of cooperating coin deflectors such as are shown at 224 are provided for the purpose of delivering improper coins deposited in the machine into the delivery chute 9 where the same will be returned to the customer. An inclined coin chute 225 extends from the upper portion of the rear side of the change holding tubes 149 and is adapted for communication with the coin receiving box 226 that is located in the bottom of the frame 29 at the rear thereof. This coin receiving box will receive coins that cannot enter the respective change holding magazines when the latter are filled and furthermore the box is adapted to receive the coins that do not have change holding tubes provided therefor.

With reference now to Figures 36 to 40, inclusive, wherein there is disclosed a modification of the change holding tubes and the ejector mechanism associated therewith, there is shown a mount plate 227 that is supported horizontally in the frame 29 and this plate is formed in its front portion with a series of coin discharge openings 228 that are disposed directly over the inner upper end portion of the delivery chute 9. The upper face of the mount plate 227 directly rearwardly of the openings 228 is inclined upwardly in a rearward direction as denoted by the numeral 229.

Each of the change holding tubes 230 is pivotally suspended at its upper end on the shaft or rod 220 that carries the hinged deflector 219, and the lower end of each change tube is cut away at an angle to cooperate with the inclined surface 229.

A stop 231 is provided on the rear portion of the frame for limiting the rearward swinging movement thereof and this stop cooperates with the lower end portion of each change holding tube in the manner as clearly illustrated in Figure 36.

The lower end of each change holding tube is formed at diametrically opposite points with the slots 232 as is shown very clearly in Figure 38, and these slots are so formed as to have the lower edge of the slots spaced from the lower end of the change holding tube to such an extent as to permit only a single coin to be disposed in this space.

A series of fork shaped ejectors 233 are secured in a stationary manner on the mount plate 227 adjacent the forward edge thereof and as is clearly shown in Figure 39, the inner edges of the furcations or arms of each fork shaped ejector extend beyond the side edges of the respective coin discharge openings 228. Furthermore, the free ends of the furcations 234 are cut away or rounded to form pointed ends that will more readily and easily enter the opposed slots 232 of the respective change holding tubes. It will also be observed that the upper faces of the stationary ejectors 233 are dished.

For the purpose of actuating the pivotally suspended change holding tubes, there is provided for each tube shown in the modification, a lever 235 that is pivotally supported intermediate its ends in a suitable bracket 236 secured on the front side of the frame 29. The lower end of this lever is forked as at 237 and a link 238 affords a pivotal connection between the forked lower end 237 of the pivoted lever 235 and the forward lower end of each swinging change holding tube 230 in the manner clearly shown in Figure 36.

A link 239 similar to the link 161 shown in Figure 15 is slidably mounted on a cross rod 240 that is supported transversely on the front side of the frame 29 and the inner end of this link is operatively connected to the upper end of the pivoted lever 235 as at 241.

A retractile coil spring 242 provides a means for returning the pivotally suspended change holding tube to its initial position so that the coins in the tube will rest on the inclined surface 229 as is clearly shown in Figure 36.

The operation of my improved vending machine may be briefly stated as follows: The several magazines 6 are filled with the merchandise to be vended, and as heretofore stated the merchandise is preferably put up in package form and may consist of candy, chewing gum, cigarettes, cigars or the like, which articles are now marketed in packages to insure the sanitary handling thereof. As the magazines are adapted to contain articles of different prices, each of the change control units associated with the magazines must necessarily be assembled with the proper combination in order to insure the delivery of the proper change to a customer when a coin of a higher denomination than the price of the article selected is inserted in the machine.

After the magazines have been filled and the change holding tubes are initially partially filled, the crown or cover 30 is placed on top of the revoluble casing 3 and may be secured thereon in any suitable manner. The ornamental cap or cover 31 is then secured in proper position on the crown 30.

A fraud preventer such as is disclosed in the patent to Donathan No. 1,619,247, March 1, 1927, may be incorporated in my improved machine for the purpose of preventing spurious coins from actuating the article ejector or the change mechanism and furthermore each coin will thereby be tested before entering the coin controlled mechanism.

In the present instance when a customer wishes to obtain any one of the articles from the machine, one of the handles 14 is grasped and the casing 3 is rotated until the selected article which is readily visible through the glass panels 8 is disposed directly over the delivery chute 9, and when this particular magazine is in alinement with the delivery chute, the spring pressed latch 16 will enter the adjacent notch 15. This will result in the sliding toothed member 27 being moved out of engagement with the teeth of the spur gear 112 as is shown in Figure 12.

Presuming that the price of the article selected is fifteen cents, it will be necessary for the customer to insert coins up to the value of fifteen cents in the slots 40 provided in the crown or cover 30. He may either insert three five-cent coins in the five cent slots, one ten-cent coin and one five-cent coin in the respective slots provided therefor, or if he does not have the proper change, a twenty five or fifty cent coin may be inserted in the respective slots provided in the crown. If only one five cent coin or two five cent coins are inserted in the machine when endeavoring to purchase a fifteen cent article, and no further smaller change is in the possession of the customer, the customer will not lose the amount inserted in the machine, due to the fact that the deflector 219 will not swing to a vertical position to uncover the change holding tubes until the proper amount has been deposited in the machine, and therefore such coins will be returned to the customer when the handle 107 has been swung forwardly and effected the movement of the pin 218 away from the arm 214.

The driven shaft 101 will rotate in the direction of the arrow and when said pin 218 has been moved away from the arm 214, the weight of the closure plate 211 will cause the arm 214 to assume a substantially vertical position whereupon said pin will come in contact with the opposite side of the arm and effect a further downward swinging movement of the closure plate so that the coins that have been deposited in the machine and which are insufficient to operate the ejector mechanism will be guided through the deflectors into the delivery chute in an obvious manner.

In Figure 25 of the drawings it will be observed that only two of the five-cent sliding finger members 195 have been raised, and this is brought about when only two five cent coins are inserted in the machine when the fifteen cent magazine is in position over the delivery chute 9. Figure 26 represents two others of the five cent sliding fingers in their raised position and in each instance, only one of the sections of the sectional plate that is associated with the five-cent fingers is raised, and this will not permit the cross bar 180 to raise the pin 184 of the foot carrying member 147 to its uppermost position in the slot 183 whereby to actuate the foot 146 to move the same into engagement or cooperation with the hook shaped member 140.

However when three five-cent coins are inserted in the machine, all three of the five cent sliding finger members 195 will be raised by the three five-cent finger engaging noses 98 associated with the arms 90, 91 and 92, respectively, being in engagement with the fingers 197 of said members 195. When the three five cent sliding finger members have been raised, the rectangular shaped plates 199 carried by the lower ends of the bars of these finger members will cooperate with the lower ends of the pivoted dogs 205 to raise the two five cent bars 203 and as the lower ends of these sliding bars 203 are operatively connected to the arms 172 of the five cent plate 171, by reason of the pins 208 extending through openings formed in the arms 172 both sections of the plate will be raised whereby to move the cross bar 180 horizontally in an upward direction, and as the pin 184 rests on the upper edge of this cross bar, said pin will also be raised and simultaneously will effect the upward sliding movement of the foot member 147.

This will result in the foot 146 being moved into cooperative relation with respect to the hook shaped member 140 carried by the forward end of the sliding bar 138 and when the rack bar 142 has been moved rearwardly so that the rearward most pin or screw 144 engages the rear end of the slot 139, a further rearward movement of this rack will cause the bar 138 to also move rearwardly thereby effecting the inward or rearward swinging movement of the change control unit that is associated with the fifteen cent magazine and manifestly as the fifteen cent change control unit swings rearwardly away from the magazine, the yoke 127 will also move inwardly.

The inward sliding movement of the yoke 127 will impart a swinging movement to the link forming bars 130 which will in turn cause the hinged ejector plate 123 to swing downwardly away from the bottom of the magazine whereupon the lowermost package that rests on the plate will by gravity drop into the delivery chute 9.

The other yoke 132 will be brought into operation during the further inward sliding movement of the yoke 127 whereby said yoke 132 will grip the next lowermost package in a manner as clearly shown in Figure 16 and and hold same in position so that only one package will be discharged from the magazine at a time.

The springs 136 and 137 will automatically return the sliding yokes to their normal positions upon the completion of a single operation of the machine and when said package gripping yoke 132 is released, the particular package gripped by said yoke will drop onto the plate 123 that will now be disposed horizontally and close the open lower end of the chute of the magazine.

The coin controlled mechanism is brought into action when the proper coins are received in the pockets provided between each pair of complementary discs and the chutes 41 guide the coins into their respective pockets. The arms that are pivotally supported on the rod 89 have their finger engaging noses moved upwardly by reason of the looped portions 100 being engaged by the cams of the particular cam carrying discs that are actuated when the proper coin or coins are inserted.

When a coin of the value of twenty five or fifty cents is inserted in its respective slot in the crown 30 of the machine, when it is desired to procure an article that sells for fifteen cents, the change making mechanism will then be brought into operation and simultaneously with the upward sliding movement of certain of the finger members 195, that control the article ejecting mechanism, the change unit that is associated with the fifteen-cent magazine will swing inwardly toward the master unit 32 and when certain of the dogs 191 are raised by the sliding plates 171, the same will engage the nose shaped heads 162 of the links 161 whereby to actuate certain of the levers 156 and these levers will in turn effect the forward sliding movement of the sliding ejector plates whereby the coin that is lodged in the coin receiving opening 154 of the slidable ejector plate will be brought forwardly and when this opening is in communication with the opening 152 the coin will then by gravity drop into the delivery chute 9 where the same will be removed together with the lowermost package discharged from the fifteen cent magazine.

Obviously when a coin of the value of twenty-five cents is inserted in the twenty-five cent slot and the same passes through the slot 38 formed therefor in the block 35 and then enters the coin controlled mechanism through one of the guide chutes 41 and the handle 107 is actuated, the article delivery mechanism will be operated simultaneously with the change making means whereby ten cents will be returned to the customer together with a package that is dispensed from the fifteen cent magazine. In a similar manner when a fifty cent coin is inserted, certain of the levers 156 will be operated to return the difference between the cost of the article and the denomination of the coin inserted where the coin is of a greater denomination than the price of the article.

During the rearward swinging movement of the change control unit mounted on the selected magazine, the bar 222 will be pushed inwardly whereby to actuate the deflector 219 so that the coins that are discharged from the coin controlled mechanism will drop into the chute 150 and from there be discharged into the respective change holding tubes thus refilling the change holding tubes so as to insure the positive operation of the machine whereby to give back change whenever a coin of a greater denomination than the price of the article selected is inserted. There is no change tube provided for fifty cent coins and therefore when a fifty cent coin is inserted the same will be guided into the coin box 226 by means of the coin chute 225, and in a similar manner, when the change tubes for receiving smaller coins are filled, additional coins that are inserted will also be delivered to the coin box 226 by reason of the chute 225.

Should the spring projected latch 16 be out of engagement with any one of the notches 15 formed in the lower edge of the depending portion 11 of the flange 10, then the toothed member 27 will be in engagement with the teeth of the spur gear 112 and thus lock the drive shaft 106 against any possibility of rotating. This will therefore indicate to the operator that the magazine carrying the article selected is not in proper position with respect to the delivery chute whereby the coin controlled mechanism may be operated to eject the selected article.

When the magazine containing the selected article is in its proper position with respect to its delivery chute 9, then the fingers 197 of the sliding finger members 195 will be disposed directly above and in the path of the upward swinging movement of the finger engaging noses 98 that are associated with the master coin controlled mechanism. At the same time the pivoted dogs 191 will be in proper position with respect to the nose shaped heads 162 and directly below the same so as to insure the proper actuation of predetermined ones of the change making mechanism. The springs that have heretofore been more fully described and which are associated with the several movable elements will automatically return all of said elements to their initial and normal positions whereby the parts are reset for use by the next customer.

When a five cent article is selected, and the five cent article holding magazine is in proper position with respect to the delivery chute, the article can be obtained from this particular magazine by inserting either a five, ten, twenty-five or fifty cent piece, and where a coin of a higher denomination than five cents is inserted, the difference between the inserted coin and five cents which is the price of the article selected will be returned simultaneously with the delivery of the package to the customer. It is of course to be understood that the combination of the sliding plate as associated with the five cent article holding magazine differs from the combination of the change control units associated with the magazines of different priced articles.

The five and ten cent finger members of the change control unit that is associated with the magazine containing five cent commodities have their fingers 197 secured together by strips 243 as shown more clearly in Figure 3 whereby the five and ten cent fingers will move as one unit when either a five or ten cent coin is inserted. A similar strip connects all of the ten cent fingers together of the unit that is carried by the ten cent article holding magazine.

While I have mentioned the use of coins of the denominations of five, ten, fifteen, twenty-five and fifty, it is to be understood that the machine may be so constructed as to vend articles to sell at different other values or prices, and at the same time return change to the customer when a coin of a higher denomination than the price of the article selected is employed.

It will thus be seen from the foregoing description, that I have provided a coin controlled vending machine which will not necessitate the attention of a clerk or attendant and the machine will be entirely automatic in its operation with respect to returning change to the customer. Furthermore, by providing a revoluble casing containing different priced article holding magazines, each of which is associated with a change control unit for cooperation with a master change control unit, the proper change will be returned to the customer regardless of the price of the article selected when a coin of a greater denomination than the price of the article is inserted in the machine.

Furthermore, each of the change control units has an article delivery mechanism that cooperates with a master coin controlled ejector operating structure.

The machine is further of such construction as to permit the parts to be readily assembled or disassembled and access to the interior of the machine may be easily had by disconnecting the complementary sections of the revoluble casing and removing the crown and cap associated therewith. A coin controlled vending machine of the present character may be constructed at a very low cost and will at all times be positive and efficient in its operation.

The master coin controlled mechanism and the cooperating change control units may also be used in conjunction with other types of vending machines, such as for example gasoline and oil dispensing pumps, perfume dispensers, etc., whereby a predetermined amount of the liquid may be obtained upon the deposit of a proper coin or coins and where a coin of a higher denomination than the purchase price is inserted, the correct change will be returned to the customer.

While I have shown the preferred embodiment of my invention, it is to be understood that various changes in the size, shape and arrangement of parts may be resorted to without departing from the spirit of the invention and the scope of the appended claims.

Having thus described the invention, what I claim as new and desire to secure by Letters Patent is:—

1. A vending machine comprising in combination, an article holding magazine, coin controlled mechanism for ejecting an article from said magazine, change holding magazines separate from the article holding magazine, an ejector for each change magazine, a change control unit arranged on the article holding magazine, cooperating means between said unit and said coin controlled mechanism for actuating said unit when a coin of a higher denomination than the cost of the article is inserted in the machine, and coacting means between said change control unit and the change ejectors for selectively actuating one or more of said ejectors to deliver the difference between the cost of the article and said coin.

2. A vending machine comprising in combination, an article holding magazine, and an ejector therefor, a change control unit pivotally supported on the magazine and operatively connected with the ejector, change holding tubes arranged separately of the article holding magazine, an ejector for each change tube, coin controlled mechanism for effecting the swinging of the change control unit and the simultaneous operation of the article ejector, cooperating means between the change control unit and the change ejectors for selectively operating one or more of the latter during the aforesaid swinging movement of the unit, when a coin of a higher denomination than the price of the article is inserted whereby the difference between the price of the article and the inserted coin is delivered, and additional means cooperating between the coin controlled mechanism and the change control unit to effect the actuation of the last mentioned means.

3. A vending machine comprising in combination, a movable magazine holder, a plurality of article holding magazines carried by said holder, the articles of one magazine being of a different price than the articles of another magazine, a coin controlled mechanism for ejecting an article from the selected magazine, change holding tubes separate from the article holding magazines, an ejector for each change tube, a change control unit carried by each article holding magazine, cooperating means between the coin controlled mechanism and the change control unit of the selected article holding magazine for actuating said unit when a coin of a higher denomination than the cost of the article is inserted in the machine, and additional cooperating means between the change control unit and the change ejectors for selectively actuating one or more of said change ejectors to deliver the difference between the price of the article and the inserted coin.

4. A vending machine comprising in combination, a plurality of commodity holding chambers adapted to receive differently priced commodities, a single coin receiving and master change making mechanism, coin controlled means for effecting the ejection of a single commodity from a selected chamber, auxiliary change making means associated with each chamber for cooperation with the master change making mechanism for delivering the difference between the price of the commodity selected and the coin deposited when the coin is of a greater denomination than the price of the selected commodity.

5. A vending machine comprising in combination, a movable magazine holder, a plurality of article holding magazines carried by said holder, the articles of one magazine being of a different price than the articles of another magazine, an ejector associated with each magazine for dispensing a single article therefrom, a single master unit, coin receiving means arranged on the unit, cooperating means arranged on each magazine and the master unit for effecting the actuation of said ejector, and change making means associated with the respective magazines and said master unit for delivering the difference between the price of the article selected and a coin of a higher denomination that is inserted in the machine.

6. A vending machine comprising in combination, a movable magazine holder, a plurality of article holding magazines carried by said holder, the articles of one magazine being of a different price than the articles of another magazine, a single master unit, an ejector associated with each magazine for effecting the delivery of a single article therefrom, a main coin controlled mechanism mounted on said master unit, cooperating means carried by each magazine for said main coin controlled mechanism to actuate said ejector, and change making means cooperatively arranged on the master unit and each magazine to return the difference between the price of the article selected and a coin of a higher denomination than is inserted in the magazine.

7. A vending machine comprising in combination, a movable magazine holder, a plurality of article holding magazines carried by the holder, the articles of one magazine being of a different price than the articles of another magazine, an ejector associated with each magazine for dispensing a single article therefrom, a stationary master unit, a supplemental unit carried by each of said magazines, coin receiving means arranged on the stationary master unit, a coin controlled mechanism arranged on said master unit for cooperation with the coin receiving means, means carried by the supplemental unit of the selected magazine for cooperation with the coin controlled mechanism to effect the actuation of said ejector, change holding tubes arranged on the stationary master unit, an ejector for each change tube, and cooperating means between the selected magazine carrying unit and the change ejectors for selectively actuating one or more of said change ejectors to deliver the difference between the price of the article selected and the inserted coin.

8. A vending machine comprising in combination, an article holding magazine, an ejector for dispensing a single article therefrom, a master unit, a supplemental unit carried by the magazine, a sliding member arranged on the master unit, coin controlled mechanism for actuating said sliding member, means for operatively connecting the supplemental unit with the ejector and said sliding member to effect the actuation of the ejector when the sliding member is operated, change holding tubes arranged on the master unit, an ejector associated with each tube, and cooperating means between the supplemental unit on the article holding magazine and said change ejector for selectively actuating one or more ejectors to deliver the difference between the price of the article and a coin of a higher denomination that is inserted in the machine.

9. A vending machine comprising in combination, an article holding magazine, an ejector for dispensing an article therefrom, a master unit, a sliding member mounted on the unit, coin controlled mechanism for actuating said sliding member, a supplemental unit carried by the article holding magazine, a slidable member arranged on the supplemental unit and operatively associated with the ejector, said slidable member of said supplemental unit being normally in an inoperative position, and cooperating means between the coin controlled mechanism and said supplemental unit for moving the sliding member of the supplemental unit to an operative position for engagement with the slidable member on the master unit whereby the ejector is operated to dispense a single article from the magazine.

10. A vending machine comprising in combination, an article holding magazine, an ejector for dispensing an article therefrom, a master unit, a sliding member mounted on the unit, coin controlled mechanism for actuating said sliding member, a supplemental unit carried by the article holding magazine, a slidable member arranged on the supplemental unit and operatively associated with the ejector, said slidable member of said supplemental unit being normally in an inoperative position, cooperating means between the coin controlled mechanism and said supplemental unit for moving the sliding member of the supplemental unit to an operative position for engagement with the slidable member on the master unit whereby the ejector is operated to dispense a single article from the magazine, and change making means associated with the master and supplemental units for delivering the difference between the price of the articles and a coin of a higher denomination that is inserted in the machine.

11. A vending machine comprising in combination, an article holding magazine, an ejector for dispensing an article therefrom, a master unit, a sliding member mounted on the unit, coin controlled mechanism for actuating said sliding member, a supplemental unit carried by the article holding magazine, a slidable member arranged on the supplemental unit and operatively associated with the ejector, said slidable member of said supplemental unit being normally in an inoperative position, cooperating means between the coin controlled mechanism and said supplemental unit for moving the sliding member of the supplemental unit to an operative position for engagement with the slidable member on the master unit whereby the ejector is operated to dispense a single article from the magazine, change holding tubes arranged on the master unit, an ejector associated with each change tube, and cooperating means between the supplemental unit and the coin controlled mechanism for actuating a predetermined change ejector to deliver change amounting to the difference between the price of the article and a coin of a higher denomination that is inserted in the machine.

12. A vending machine comprising in combination, a revoluble magazine holder, a plurality of article holding magazines carried thereby, the articles of one magazine being of a different price than the articles of another magazine, an ejector for each magazine, a master unit arranged centrally within the revoluble magazine holder, coin receiving means in the upper portion of the master unit, a supplemental unit carried by each of the magazines, a normally disconnected coacting means between the master unit and the supplemental unit, coin controlled mechanism arranged on the master unit for cooperation with the coin receiving means, additional means carried by the supplemental unit for cooperation with the coin controlled mechanism whereby the aforesaid disconnected coacting means is disposed in an operative position, and additional means for actuating said operatively connected means to effect the actuation of the ejector to dispense an article from the selected magazine.

13. A vending machine comprising in combination, a revoluble magazine holder, a plurality of article holding magazines carried thereby, the articles of one magazine being of a different price than the articles of another magazine, an ejector for each magazine, a master unit arranged centrally within the revoluble magazine holder, coin receiving means in the upper portion of the master unit, a supplemental unit carried by each of the magazines, a normally. disconnected coacting means between the master unit and the supplemental unit, coin controlled mechanism arranged on the master unit for cooperation with the coin receiving means, additional means carried by the supplemental unit for cooperation with the coin controlled mechanism whereby the aforesaid disconnected coacting means are disposed in an operative position, additional means for actuating said operatively connected means to effect the actuation of the ejector to dispense an article from the selected magazines, change holding tubes mounted on the master unit, an ejector for each change tube, and cooperating means between the supplemental unit of the selected magazine and said change ejectors for selectively actuating one or more of said change ejectors to deliver the difference between the price of the selected article and the coin of a higher denomination inserted in the machine.

14. A vending machine comprising in combination, an article holding magazine, coin controlled mechanism for effecting the ejection of an article from the magazine, change holding tubes arranged independently of the article holding magazine, an ejector associated with each change tube, a change control unit carried by the magazine, one or more members carried by the change control unit and operable by said coin controlled mechanism, and change ejector actuating members cooperating with the aforesaid members carried by the change control unit to selectively actuate one or more of the ejectors and deliver change amounting to the difference between the price of the article and a coin of a higher denomination that is inserted in the machine.

15. A vending machine comprising in combination, a movable magazine holder, a plurality of article holding magazines carried thereby, the articles of one magazine being of a different price than the articles of another magazine, an ejector for each magazine, a master unit, a sliding bar mounted on the master unit, a supplemental unit carried by each magazine, said supplemental unit being pivotally suspended at its upper end, the lower end of the supplemental unit being operatively connected to the ejector, a vertically sliding member carried by the lower portion of the supplemental unit and normally disconnected from the sliding member mounted on the master unit, coin receiving means mounted in the upper portion of the master unit, cooperating means between the coin receiving means and the supplemental unit for moving the vertically sliding member on the supplemental unit into operative engagement with the sliding member on the master unit whereby said ejector may be actuated to dispense a single article from the selected magazine, and coacting means between the supplemental unit and the master unit operable during the swinging movement of the supplemental unit to deliver change amounting to the difference between the price of the selected article and a coin of a higher denomination that is inserted in the machine.

16. A vending machine comprising in combination, a holder for the material to be dispensed, dispensing means associated with the holder, a master coin controlled unit, a supplemental unit, carried by the holder cooperating means between the units to effect the actuation of the dispensing means, and additional mechanism controlled by the supplemental unit for automatically returning change when a coin of a higher denomination than the price of the material purchased is inserted in the machine.

17. A vending machine comprising in combination, a holder for the material to be dispensed, dispensing means associated with the holder, a master unit, a supplemental unit carried by the holder, change holding tubes arranged on the master unit, cooperating means between the units to effect the actuation of the dispensing means upon the insertion of a coin or coins, additional means cooperating between the supplemental unit and the change holding tubes for automatically returning change when a coin of a higher denomination than the purchase price is inserted in the machine, and means for preventing coins of a denomination less than the purchase price being retained in the machine.

18. A vending machine comprising in combination, a holder for the material to be dispensed, dispensing means associated with the holder, a master unit, a supplemental unit, change holding tubes arranged on the master unit, cooperating means between the units to effect the actuation of the dispensing means upon the insertion of a coin or coins, additional means cooperating between the supplemental unit and the change holding tubes for automatically returning change when a coin of a higher denomination than the purchase price is inserted in the machine, means for preventing coins of a denomination less than the purchase price being retained in the machine, and means operable by the supplemental unit for actuating said last mentioned means to cause the deposited coin or coins to enter the change tubes when the proper amount is inserted in the machine.

19. A vending machine comprising in combination, a holder for the material to be dispensed, dispensing means associated with the holder, coin controlled mechanism for effecting the actuation of the dispensing means, change holding tubes arranged beneath the coin controlled mechanism, coin chutes interposed between the coin controlled mechanism and the change tubes, a deflector normally extending over the upper open ends of the change holding tubes to prevent coins inserted in the machine whose denominations are less than the purchase price from entering the change holding tubes, additional deflectors cooperating with one another to return such coins to the customer, and means for moving the first mentioned deflector to an inoperative position when the proper amount is inserted in the machine.

20. A vending machine comprising in combination, a material holding magazine, dispensing means associated therewith, a master unit, a supplemental unit, a member movably mounted on the supplemental unit for cooperation with the dispensing means, a member slidable on the master unit for cooperation with the aforesaid movable member and normally disconnected therefrom, coin receiving means mounted on the master unit, arm members pivotally mounted on the master unit, finger members slidably mounted on the supplemental unit and selectively engaged by the pivoted arm members, and cooperating means between the slidable finger members and the movable member that cooperates with the dispensing means for actuating said movable member to move the same to an operative position with respect to the sliding member on the master unit and effect the operation of the dispensing means.

21. A vending machine comprising in combination, an article holding magazine, article releasing means therefor, a coin controlled mechanism arranged in the machine, a vertically swinging unit arranged on the magazine, means at the lower end of the unit having cooperative relation with the article releasing means, operating mechanism in the machine for cooperation with the last mentioned means to actuate the article releasing means, the upper portion of the unit being constructed for actuation by the coin controlled mechanism to move the means at the lower end of the unit into operative engagement with said operating mechanism.

22. A vending machine comprising in combination, an article holding magazine, article releasing means therefor, a coin controlled mechanism arranged in the machine, a vertically swinging unit arranged on the magazine, means at the lower end of the unit having cooperative relation with the article releasing means, operating mechanism in the machine for cooperation with the last mentioned means to actuate the article releasing means, the upper portion of the unit being constructed for actuation by the coin controlled mechanism to move the means at the lower end of the unit into operative engagement with said operating mechanism, an article gripping means operatively connected with the vertically swinging unit to hold the articles in the magazine during the discharge of the lowermost article from the magazine.

23. A vending machine comprising in combination, an article holding magazine, article releasing means therefor, a coin controlled mechanism arranged within the machine, a vertically swinging unit carried by the article holding magazine, means arranged on the lower end of the said unit for cooperative relation with the article releasing means, operating mechanism in the machine for cooperation with the last mentioned means to actuate the article releasing means, means arranged on said unit, and being operatively connected to the means on the lower end of the unit and constructed for actuation by the coin controlled mechanism to move the second mentioned means into operative engagement with the operative mechanism, change holding tubes arranged independently of the article holding magazine, an ejector associated with each change tube, and cooperating means between the unit and the change ejectors for selectively actuating one or more change ejectors to deliver the difference between the price of the article and the inserted coin.

24. A vending machine comprising in combination, an article holding magazine, article releasing means therefor, a coin controlled mechanism arranged within the machine, a vertically swinging unit carried by the article holding magazine, means arranged on the lower end of the said unit for cooperative relation with the article releasing means, operating mechanism in the machine for cooperation with the last mentioned means to actuate the article releasing means, means arranged on said unit, and being operatively connected to the means on the lower end of the unit and constructed for actuation by the coin controlled mechanism to move the second mentioned means into operative engagement with the operative mechanism, change holding tubes arranged independently of the article holding magazine, an ejector associated with each change tube, cooperating means between the unit and the change ejectors for selectively actuating one or more change ejectors to deliver the difference between the price of the article and the inserted coin, a pivoted deflector over each change tube at the upper end thereof to normally prevent the discharge of coins into said change tube, and means operable by the swinging movement of the unit on the article holding magazine to actuate the deflector and move the same to an inoperative position when the coin controlled mechanism is operated.

25. A vending machine comprising in combination, an article holding magazine, article releasing means therefor, a member movably mounted on the article holding magazine, and being cooperatively connected with the article releasing means, an operating mechanism in the machine for cooperation with said movable member to actuate the article releasing means, a coin controlled mechanism in the machine, and additional means cooperatively connecting the coin controlled mechanism with the movable member on the article holding magazine to move the latter into operative engagement with said operating mechanism.

26. A vending machine comprising in combination, an article holding magazine, article releasing means therefor, a member movably mounted on the article holding magazine, and being cooperatively connected with the article releasing means, an operating mechanism in the machine for cooperation with said movable member to actuate the article releasing means, a coin controlled mechanism in the machine, additional means cooperatively connecting the coin controlled mechanism with the movable member on the article holding magazine to move the latter into operative engagement with said operating mechanism, means arranged within the magazine and cooperatively connected with the movable member for retaining the articles in said magazine during the discharge of the lowermost article therefrom.

27. A vending machine comprising in combination, an article holding magazine, article releasing means, a unit pivotally secured at its upper end on the article holding magazine, a vertically movable member projecting from the lower end of the unit, and having cooperative relation with the article releasing means, operating mechanism in the machine for cooperation with the vertically movable member at the lower end of the swinging unit to actuate the releasing means, a coin controlled mechanism arranged in the machine, additional means carried by the unit and operable by the coin controlled mechanism for moving the vertically movable member at the lower end of the unit into operative engagement with said operating mechanism, change holding tubes arranged in the machine, change ejectors for the respective tubes, change ejector actuating members mounted in the machine, and cooperating means between said change ejector actuating members and the swinging unit to selectively actuate one or more of the ejectors and deliver change amounting to the difference between the price of the article and a coin of a higher denomination that is inserted in the machine, the change ejector members being operated by the swinging movement of the unit.

28. A vending machine comprising in combination, an article holding magazine, article releasing means, a unit pivotally secured at its upper end on the article holding magazine, a vertically movable member projecting from the lower end of the unit, and having cooperative relation with the article releasing means, operating mechanism in the machine for cooperation with the vertically movable member at the lower end of the swinging unit to actuate the releasing means, a coin controlled mechanism arranged in the machine, additional means carried by the unit and operable by the coin controlled mechanism for moving the vertically movable member at the lower end of the unit into operative engagement with said operating mechanism, change holding tubes arranged in the machine, change ejectors for the respective tubes, change ejector actuating members mounted in the machine, and cooperating means between said change ejector actuating members and the swinging unit to selectively actuate one or more of the ejectors and deliver change amounting to the difference between the price of the article and a coin of a higher denomination that is inserted in the machine, the change ejector members being operated by the swinging movement of the unit, a coin deflector arranged over the upper open end of each tube for normally preventing the delivery of the coins inserted in the machine in the respective tubes when a coin or coins of insufficient value is inserted in the machine, and means associated with said deflector, and operable by the swinging unit for moving said deflector to an inoperative position when the proper coin or coins are inserted.

29. A coin control for an ejector actuating mechanism of a vending machine comprising in combination, a plurality of pairs of discs, one of said discs of each pair being normally rotatable with respect to the other or complementary disc, each pair of discs being provided with coacting pocket forming elements on the inner opposed faces to receive a coin whereby to interlock the disc for simultaneous rotation, a cam carried by one of the discs of each pair, a series of arms pivotally supported at their intermediate portion, the inner end of each arm being formed with a looped portion for cooperation with the respective cams whereby said pivoted arms are actuated, and ejector mechanism actuating heads arranged on the outer ends of said pivoted arms.

30. A vending machine comprising in combination, an article holding magazine, article releasing means therefor, a coin controlled mechanism in the machine, a unit pivotally secured at its upper end on the rear side of the magazine, a foot member arranged for vertical slidable movement on the lower portion of said unit, and being operatively connected with the article releasing means, operating mechanism in the machine for cooperation with the foot member to actuate the article releasing means, slidable fingers arranged on the upper portion of the unit constructed for actuation by the coin controlled mechanism, means cooperatively connecting the sliding fingers with said slidable foot member to move the same into operative engagement with said operating mechanism.

31. A vending machine comprising in combination, an article holding magazine, article releasing means therefor, a coin controlled mechanism in the machine, a unit pivotally secured at its upper end on the rear side of the magazine, a foot member arranged for vertical slidable movement on the lower portion of said unit, and being operatively connected with the article releasing means, operating mechanism in the machine for cooperation with the foot member to actuate the article releasing means, slidable fingers arranged on the upper portion of the unit constructed for actuation by the coin controlled mechanism, means cooperatively connecting the sliding fingers with said slidable foot member to move the same into operative engagement with said operating mechanism, change holding tubes arranged in the machine, an ejector for each tube, a pivoted lever operatively connected at its lower end to each ejector member, and coacting means between the upper end of each lever and said unit for selectively actuating the change ejectors to deliver change amounting to the difference between the price of the article and a coin of a higher denomination that is inserted in the machine, said pivoted levers being operated during the swinging movement of the unit.

32. A vending machine comprising in combination, an article holding magazine, article releasing means therefor, a coin controlled mechanism in the machine, a unit carried by the rear side of the article holding magazine, a vertically slidable foot member carried by the lower portion of said unit and being operatively connected with the article releasing means, operating mechanism in the machine for cooperation with said foot member to actuate the article releasing means, and being normally disposed out of cooperative engagement with said foot member, a slidable finger carried by the upper portion of the unit and constructed for actuation by the coin controlled mechanism, means for interconnecting the slidable finger with the slidable foot member whereby to move the latter into operative engagement with said operating mechanism.

33. A vending machine comprising in combination, an article holding magazine open at its lower end, a vertically swinging closure for the open lower end of the magazine, a unit mounted on the magazine for vertical swinging movement, a slidable member carried by the lower end portion of the magazine and being operatively connected with the vertically swinging closure, means for operatively connecting the swinging unit with said sliding member for actuating the latter, and a coin controlled mechanism for swinging the unit to effect the actuation of a swinging closure to an article releasing position.

34. A vending machine comprising in combination, an article holding magazine open at its lower end, a vertically swinging closure for the open lower end of the magazine, a unit mounted on the magazine for vertical swinging movement, a slidable member carried by the lower end portion of the magazine and being operatively connected with the vertically swinging closure, means for operatively connecting the swinging unit with said sliding member for actuating the latter, and a coin controlled mechanism for swinging the unit to effect the actuation of a swinging closure to an article releasing position, and an article gripping yoke operatively associated with the slidable member to hold the articles in the magazine during the discharge of the lowermost article from the magazine.

In testimony whereof I affix my signature.
JOHN H. FARRAR.